United States Patent
Suzuki et al.

(10) Patent No.: US 9,527,345 B2
(45) Date of Patent: Dec. 27, 2016

(54) WHEEL BEARING APPARATUS

(71) Applicant: NTN Corporation, Osaka-shi (JP)

(72) Inventors: Syougo Suzuki, Iwata (JP); Shigeaki Fukushima, Iwata (JP); Masuo Takaki, Iwata (JP); Sadako Takada, Iwata (JP); Hisashi Ohtsuki, Iwata (JP)

(73) Assignee: NTN Corporation, Osaka-shi (JP)

( * ) Notice: Subject to any disclaimer, the term of this patent is extended or adjusted under 35 U.S.C. 154(b) by 147 days.

(21) Appl. No.: 14/491,991

(22) Filed: Sep. 20, 2014

(65) Prior Publication Data

US 2015/0069826 A1 Mar. 12, 2015

Related U.S. Application Data

(63) Continuation of application No. PCT/JP2013/058141, filed on Mar. 21, 2013.

(30) Foreign Application Priority Data

Mar. 21, 2012 (JP) .................................. 2012-064296
Mar. 26, 2012 (JP) .................................. 2012-068664
(Continued)

(51) Int. Cl.
*B60B 27/00* (2006.01)
*F16C 33/72* (2006.01)
(Continued)

(52) U.S. Cl.
CPC ....... *B60B 27/0068* (2013.01); *B60B 27/0005* (2013.01); *F16C 33/64* (2013.01);
(Continued)

(58) Field of Classification Search
CPC .. B60B 27/00; B60B 27/0068; B60B 27/0005; B60B 2380/73; F16C 33/783; F16C 33/768; F16C 33/64; F16C 33/723; F16C 19/186
(Continued)

(56) References Cited

U.S. PATENT DOCUMENTS 6,997,615 B2 * 2/2006 Takada ................ B60B 27/0005
                                                          384/448
7,980,766 B2 * 7/2011 Tsuzaki ............... B60B 27/0084
                                                          384/489

(Continued)

FOREIGN PATENT DOCUMENTS

| JP | 2007-205392 | 8/2007 |
| JP | 2007-315411 | 12/2007 |

(Continued)

*Primary Examiner* — S. Joseph Morano
*Assistant Examiner* — Jean Charleston
(74) *Attorney, Agent, or Firm* — Harness, Dickey & Pierce, P.L.C.

(57) ABSTRACT

A wheel bearing apparatus has an outer member, an inner member and double row rolling elements. A pulser ring is fit onto the inner ring. A second cap is fit on the inboard-side end of the outer member. A rotational speed sensor is mounted on the second cap. A cup-shaped first cap is press-fit into the inner circumference of an inboard-side end of the outer member. The first cap has a cylindrical fitting portion press-fit into the outer member. A disk portion extends radially inward from the fitting portion. The sensor abuts the disk portion. The second cap is press-fit into the inner circumference of an inboard-side end of the outer member via a predetermined interference.

19 Claims, 24 Drawing Sheets

(30) Foreign Application Priority Data

| | | |
|---|---|---|
| Mar. 26, 2012 | (JP) | 2012-069275 |
| Mar. 28, 2012 | (JP) | 2012-072794 |
| Jun. 28, 2012 | (JP) | 2012-145800 |

(51) Int. Cl.

| | |
|---|---|
| *F16C 41/00* | (2006.01) |
| *F16C 43/04* | (2006.01) |
| *F16C 33/64* | (2006.01) |
| *F16C 33/76* | (2006.01) |
| *F16C 33/78* | (2006.01) |
| *F16C 19/18* | (2006.01) |

(52) U.S. Cl.

CPC .......... *F16C 33/723* (2013.01); *F16C 33/768* (2013.01); *F16C 33/783* (2013.01); *F16C 41/007* (2013.01); *F16C 43/045* (2013.01); *B60B 27/00* (2013.01); *B60B 2380/73* (2013.01); *F16C 19/186* (2013.01); *F16C 2326/02* (2013.01)

(58) Field of Classification Search

USPC ...... 301/109, 105.1; 384/448, 489, 544, 589
See application file for complete search history.

(56) References Cited

U.S. PATENT DOCUMENTS

| | | | | |
|---|---|---|---|---|
| 8,393,795 | B2* | 3/2013 | Aritake | F16C 33/768 |
| | | | | 384/448 |
| 2004/0258337 | A1* | 12/2004 | Norimatsu | F16C 19/386 |
| | | | | 384/448 |
| 2007/0268013 | A1* | 11/2007 | Yamamoto | F16C 33/723 |
| | | | | 324/174 |
| 2007/0286541 | A1* | 12/2007 | Matsui | F16C 33/723 |
| | | | | 384/448 |
| 2011/0254356 | A1* | 10/2011 | Yamamoto | B60B 27/0005 |
| | | | | 301/109 |
| 2012/0177312 | A1 | 7/2012 | Aritake et al. | |
| 2012/0281939 | A1 | 11/2012 | Nakamura et al. | |

FOREIGN PATENT DOCUMENTS

| | | |
|---|---|---|
| JP | 2009-144791 | 7/2009 |
| JP | 2010-106909 | 5/2010 |
| JP | 2010-180912 | 8/2010 |
| JP | 2011-047447 | 3/2011 |
| JP | 2011-117583 | 6/2011 |
| JP | 2011-174511 | 9/2011 |
| JP | 2011-196425 | 10/2011 |
| JP | 2011-201347 | 10/2011 |

* cited by examiner

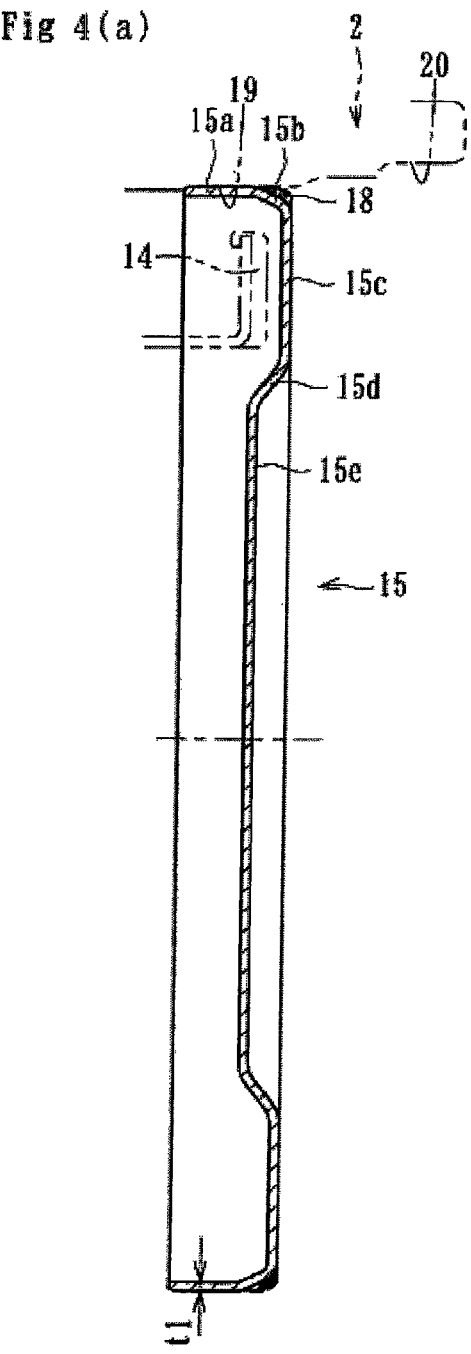
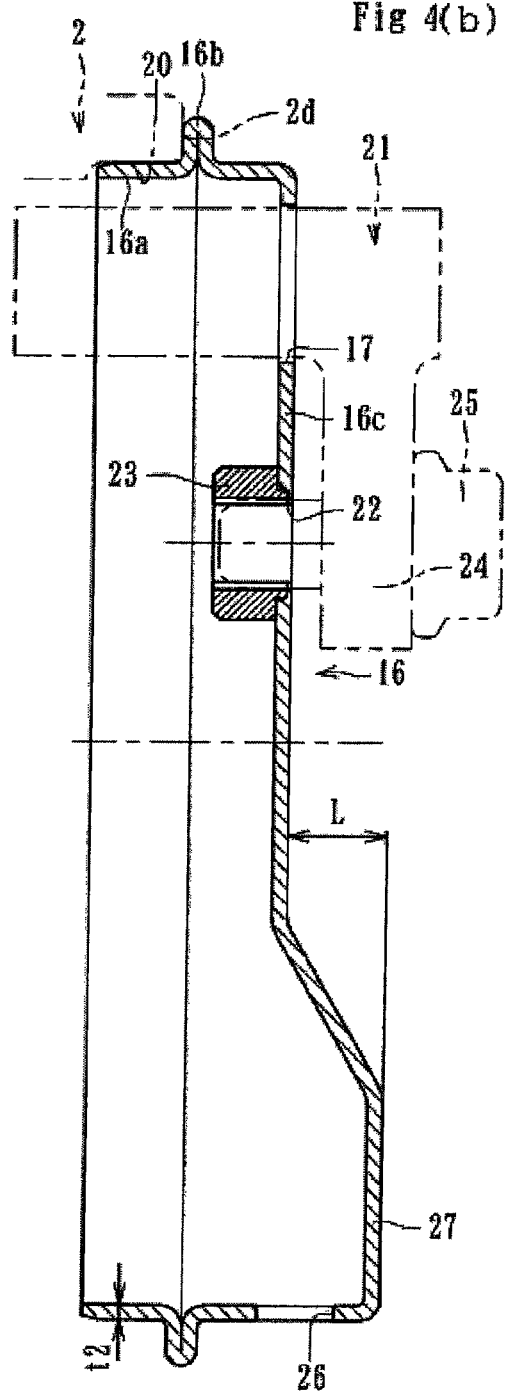
Fig 4(a)
Fig 4(b)

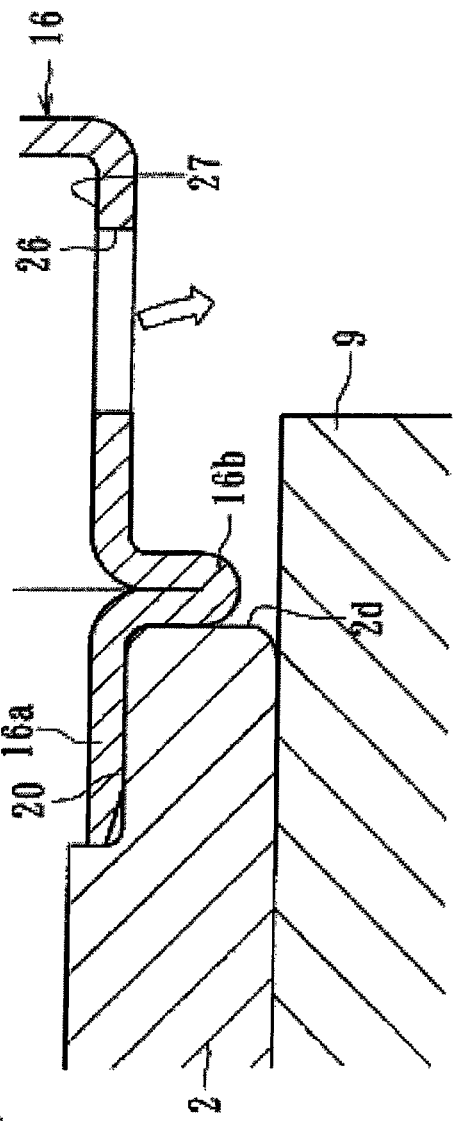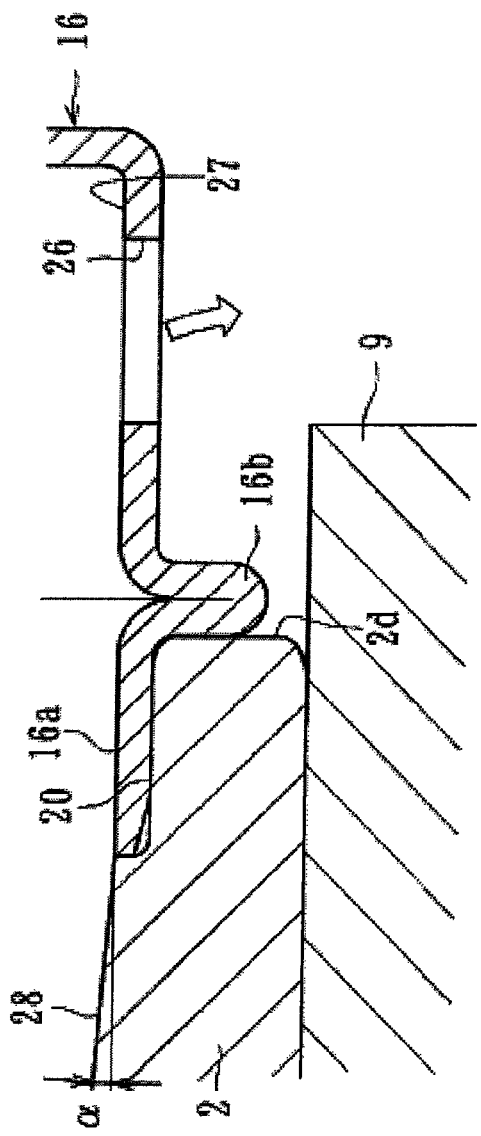
Fig 6(a)
Fig 6(b)

WHEEL BEARING APPARATUS

CROSS-REFERENCE TO RELATED APPLICATIONS

This application is a continuation of International Application No. PCT/JP2013/058141, filed Mar. 21, 2013, which claims priority to Japanese Application Nos. 2012-064296, filed Mar. 21, 2012; 2012-068664, filed Mar. 26, 2012; 2012-069275, filed Mar. 26, 2012; 2012-072794, filed Mar. 28, 2012; and 2012-145800, filed Jun. 28, 2012. The disclosures of the above applications are incorporating herein by reference.

FIELD

The present disclosure generally relates to a wheel bearing apparatus that rotationally supports a vehicle wheel, such as an automobile, with respect to a suspension apparatus and, more particularly, to a wheel bearing apparatus adapted to mount a rotational speed sensor to detect wheel speed of a vehicle.

BACKGROUND

It is generally known that a wheel bearing apparatus can support a wheel of vehicle with respect to a suspension apparatus and detect a rotation speed of a wheel of vehicle to control the anti-lock braking system (ABS). Such a bearing apparatus generally includes a sealing apparatus arranged between inner and outer members. The inner and outer member rotates relative to each other via rolling elements. The rotational speed detecting apparatus includes a magnetic encoder with magnetic poles alternately arranged along its circumference. The magnetic encoder is integrally formed with the sealing apparatus. A rotational speed sensor detects change of the magnetic poles of the magnetic encoder caused by the rotation of a wheel.

In general, the rotational speed sensor is mounted on a knuckle after the wheel bearing apparatus has been mounted on the knuckle to form part of a suspension apparatus. Recently, a wheel bearing apparatus has been proposed to receive a rotational speed sensor in order to reduce the size of the wheel bearing apparatus. Also, it eliminates the complexity of adjusting an air gap between the rotational speed sensor and a magnetic encoder.

FIG. 24 illustrates one example of a wheel bearing apparatus. This wheel bearing apparatus includes an outer member 101, forming a stator member, secured on a knuckle (not shown). The outer member 101 includes double row outer raceway surfaces 101a (only one of them is shown). A wheel hub 103 is inserted into the outer member 101, via double row balls 102. An inner ring 104 is fit onto the wheel hub 103.

One inner raceway surface (not shown) is formed on the outer circumference of the wheel hub 103. The other inner raceway surface 104a is formed on the outer circumference of the inner ring 104. The inner ring 104 is press-fit onto a cylindrical portion 103a that axially extends from the inner raceway surface of the wheel hub 103. The double row balls 102 are contained and rollably held by cages 105 between the outer and inner raceway surfaces.

The wheel hub 103 has, on its one end, a wheel mounting flange to mount a wheel. The inner ring 104 is axially immovably secured by a caulked portion 106 to the wheel hub 103. The caulked portion 106 is formed by plastically deforming, radially outward, the end of the cylindrical portion 103a. The inboard-side end of the outer member 101 is provided with a first cap (i.e. cover) 107 to prevent leakage of lubricating grease contained in the wheel bearing. Also, the cap 107 prevents entry of rain water or dust into the wheel bearing from the outside.

The first cap 107 is formed of austenitic stainless steel sheet, such as SUS 304, non-magnetic metal sheet, such as aluminum alloy, or non-metallic sheet, such as a plastic sheet. It has a bottom portion 108, a flat portion 108a at the bottom portion 108 and a cylindrical portion 109. The cylindrical portion 109 axially extends from the outer periphery of the bottom portion 108. In addition, a flange-like abutting portion 110 extends radially outward from the cylindrical portion 109. Thus, the abutting portion 110 abuts against the inboard-side end face of the outer member 101.

The bottom portion 108 has the flat portion 108a and a bulged portion 108b arranged at the center of the bottom portion 108. The bulged portion 108b bulges toward an axially inboard-side from the flat portion 108a. In addition, a sealing member 111, of elastomer such as rubber, is arranged on the outer circumference of the cylindrical portion 109.

The first cap 107 is secured on the outer member 101. The cylindrical portion 109 is press-fit, via interference fit, into the axially inboard-side end of the outer member 101. In addition, the outboard-side surface of the abutting portion 110 of the first cap 107 abuts against the inboard-side end face of the outer member 101. The outboard-side surface of the flat portion 108a closely opposes a magnetic encoder 112 press-fit onto the inner ring 104.

A second cap (i.e. sensor holding plate) 114 holds a sensor 113. The second cap 114 is press-fit, via interference fit, onto the axially inboard-side end of the outer member 101. The second cap 114 is formed of ferrous metal, such as carbon steel or stainless steel, non-ferrous metal such as aluminum alloy or plastics. The second cap 114 is shaped to have a generally dish-like shape. It includes a flat disk-shaped bottom portion 115 and a cylindrical fitting portion 116 bent axially outboard from the bottom portion 115. A through aperture 117 is formed at a radially outward position of the bottom portion 115. A mounting aperture 118 is formed at a position near the center of the bottom portion 115. A nut 119 is secured around the mounting aperture 118 by welding, adhesion, press-fitting or caulking.

The fitting portion 116 of the second cap 114 is press-fit onto the axially inboard-side end of the outer member 101. Thus, the abutting portion 110 of the first cap 107 is sandwiched axially on both sides between the bottom portion 115 and the outer member 101. Thus, the second cap 114 can prevent the first cap 107 from being displaced toward the axially inboard-side direction and cover the first cap 107 from the axially inboard-side via a space 120.

In order to secure the sensor 113 to the bearing apparatus, the tip end of the sensor 113 is first inserted through the aperture 117 into the space 120. The tip end of the sensor 113 abuts against the axially inboard-side surface of the flat portion 108a of the bottom portion 108. A bolt 121 is fastened to the nut 119 by passing the nut 119 through an aperture formed in a mounting flange 122 of the sensor 113.

As can be understood from the description above, the first cap 107 encloses an inside space 123 where the magnetic encoder 112 is arranged. The second cap 114 can prevent the first cap 107 from being pushed and displaced toward the magnetic encoder 112 by the abutting operation of the detecting portion (tip end) of the sensor 113. Also, the second cap 114 can exactly limit the axial displacement of the first cap 107. In addition, the second cap 114 can prevent the generation of deformation of the first cap 107 by any force that would cause deterioration in detection accuracy.

A radially inward force is applied to the bottom portion 108 of the first cap 107 when the cylindrical portion 109 of the first cap 107 is press-fit into the end of the outer member 101. The applied energy is used to deform the bulged portion 108b. As the result of which, it is possible to effectively suppress the deformation of the flat portion 108a and exactly limit the axial position of the flat portion 108a. (See, JP 2010-180912 A.

In such a prior art wheel bearing apparatus, the first cap 107 is press-fit into the inner circumference of the end of the outer member 101. The second cap 114 is press-fit onto the outer circumference of the end of the outer member 101. Accordingly, the cylindrical fitting portion 116 of the second cap 114 would expand into a horn-like shape and slip off from the outer member 101 when the outer member 101 is deformed due to vibrations or application of a large load. In addition, the rigidity of the prior art second cap 114 of the outer circumference-fitting type is smaller than that of the sensor holding plate of the inner circumference-fitting type. Thus, it is believed that insufficient strength and rigidity of the sensor holding plate of the outer circumference-fitting type cannot maintain stable detection accuracy for a sensor 113.

It is, therefore, an object of the present disclosure to provide a wheel bearing apparatus that can solve problems of prior art and thus achieve improved detection accuracy and sealability by increasing the rigidity of the second cap.

To achieve the above mentioned object, a wheel bearing apparatus comprises an outer member with double row outer raceway surfaces integrally formed on its inner circumference. An inner member includes a wheel hub and at least one inner ring. The wheel hub is integrally formed, on its one end, with a wheel mounting flange. A cylindrical portion axially extends from the wheel mounting flange, The inner ring is press-fit onto the cylindrical portion of the wheel hub. The inner member outer circumference includes double row inner raceway surfaces. The double row inner raceway surfaces oppose the double row outer raceway surfaces. Double row rolling elements are contained between the inner raceway surfaces and outer raceway surfaces of the inner member and outer member. A pulser ring is adapted to fit onto the outer circumference of the inner ring. The pulser ring has magnetic characteristics alternately and equidistantly varying along its circumferential direction. A cup-shaped second cap, press-formed from steel sheet, is fit onto the inboard-side end of the outer member. A rotational speed sensor is mounted on the second cap at a radially outer position. The rotational speed sensor is arranged opposite to the pulser ring, via a predetermined axial air gap. A cup-shaped first cap is press-fit into the inner circumference of an inboard-side end of the outer member, via a predetermined interference. The first cap is press-formed from non-magnetic austenitic stainless steel sheet. The first cap has a cylindrical fitting portion press-fit into the inner circumference of the inboard-side end of the outer member. A disk portion extends radially inward from the fitting portion and opposes the pulser ring, via a small axial gap. The rotational speed sensor is arranged opposite to the pulser ring, via the first cap. The speed sensor abuts against or is close to the disk portion of the first cap. The second cap is press-fit into the inner circumference of an inboard-side end of the outer member via a predetermined interference.

The wheel bearing apparatus has a pulser ring adapted to fit onto the outer circumference of the inner ring, with magnetic characteristics alternately and equidistantly varying along its circumferential direction. A cup-shaped second cap, press-formed of steel sheet, is fit on the inboard-side end of the outer member. A rotational speed sensor is mounted on the second cap at a radially outer position. The rotational speed sensor is arranged opposite to the pulser ring via a predetermined axial air gap. A cup-shaped first cap is press-fit into the inner circumference of an inboard-side end of the outer member, via a predetermined interference. The first cap is press-formed from non-magnetic austenitic stainless steel sheet. The first cap has a cylindrical fitting portion press-fit into the inner circumference of the inboard-side end of the outer member. A disk portion extends radially inward from the fitting portion and opposes the pulser ring via a small axial gap. The rotational speed sensor is arranged opposite to the pulser ring, via the first cap. The speed sensor abuts against or is close to the disk portion of the first cap. The second cap is press-fit into the inner circumference of an inboard-side end of the outer member, via a predetermined interference. Thus, it is possible to provide a wheel bearing apparatus with reliability and that can achieve improved detection accuracy and sealability by increasing the rigidity of the second cap.

A first fitting surface is formed on the inner circumference of the inboard-side end of the outer member. A second fitting surface is formed on the inner circumference of the outer member at a further inboard-side from the first fitting surface, via a stepped portion. The first cap is press-fit onto the first fitting surface. The second cap is press-fit onto the second fitting surface. This makes it possible to suppress the press-fitting stroke minimum and improve the assembling workability as well as to prevent deformation of the first cap during the press-fitting process. Thus, this improves the reliability of the wheel bearing apparatus.

The first fitting surface and the second fitting surface are simultaneously ground by a formed grinding wheel with the double row outer raceway surfaces. This makes it possible to improve the accuracy in the roundness and coaxiality of each fitting surface. Thus, this improves the sealability of the fitting portions. In addition, the simultaneous grinding can reduce working steps and thus manufacturing costs.

The second cap has a cylindrical fitting portion fit on the inner circumference of the inboard-side end of the outer member. A flange portion is formed as a double bent portion. The flange portion extends radially outward from the fitting portion. The flange portion is adapted to closely contact against the inboard-side end face of the outer member. A bottom portion extends radially inward from the flange portion to close an inboard-side opening of the outer member. An insert aperture is formed in the bottom portion at a position corresponding to the pulser ring. The rotational speed sensor is inserted and mounted in the aperture. This makes it possible to increase the rigidity of the second cap. Thus, this improves the positioning accuracy in the rotational speed sensor. In addition, it is possible to suppress air gap variation between the rotational speed sensor and the pulser ring. Thus, this obtains stable detection accuracy even if the outer member and the inner member would be relatively inclined by a lateral load applied to them from a wheel.

A depth of the second fitting surface is larger than the thickness of the second cap. This makes it possible to make the fitting portion of the second cap to project from the inner circumference of the end of the outer member. Thus, this prevents foreign matter from entering within the second cap and from accumulated in this place.

The inner circumference between the first fitting surface and the second fitting surface of the outer member is formed as a tapered surface. Its radius gradually increases at an angle toward the opening of the outer member. This makes it possible to smoothly displace foreign matter that enters within the second cap without residence.

The second cap is coated with a rust-preventing coating film by cation electro-deposition. This makes it possible to keep a smooth surface on the fitting surface while embedding micro irregularities and preventing easy peeling of the rust-preventing coating film during the press-fitting of the outer member. Accordingly, it is possible to prevent the generation of rust in the fitting portion of the second cap for a long term. Thus, this obtains good sealability in the fitting portion between the second cap and the outer member.

The second cap is formed from rust-prevented steel sheet. An elastic member is integrally adhered on the second cap at a portion contacting the outer member. This makes it possible to improve the sealability and reliability of the second cap.

The elastic member of the second cap is formed from rust-preventing coating film by cation electro-deposition. This makes it possible to prevent the generation of rust on the abutting portion for a long term and to keep good sealability.

The elastic member of the second cap is a packing member formed from synthetic rubber integrally adhered to the second cap by vulcanized adhesion.

A bulged portion is formed on the bottom portion of the second cap at a region nearer to the ground. A drain is radially cut-through and formed in a bottom wall of the bulged portion. This makes it possible to effectively discharge foreign matter outside without being disturbed by a knuckle of a vehicle even when the knuckle projects to the inboard-side from the end of the outer member.

The drain is formed as a tongue by punching and bending the bottom wall of the bulged portion. According to this structure, the tongue can close an opening of the drain and perform a protecting wall to prevent entry of muddy water or pebbles. Thus, this can maintain the speed detecting accuracy and improve the reliability of an ABS.

A radially reduced portion is formed between the fitting portion and the disk portion of the first cap. An elastic member, of synthetic rubber, is integrally adhered to the radially reduced portion by vulcanized adhesion. The elastic member is arranged so that it does not project from the side surface of the disk portion toward the inboard-side. This prevents the elastic member from interfering with the rotational speed sensor. The elastic member is formed with an annular projection projecting radially outward from the fitting portion. According to this structure, the annular projection of the elastic member is elastically deformed and pressed onto the inner circumference of the outer member during press-fitting of the first cap. Thus, the sealability of the fitting portion can be improved.

The second cap is formed from steel sheet. The second cap is press-fit, via a predetermined interference, into the inner circumference of the inboard-side end of the outer member in an overlapped state with the first cap. This makes it possible to provide a wheel bearing apparatus that improves the detecting accuracy and sealability. Also, it can reduce the manufacturing cost while reducing assembling steps by press-fitting both the first and second caps by a single press-fitting operation.

A stepped portion is formed on an open end of the fitting portion of the second cap. The stepped portion and the fitting portion of the first cap have predetermined width dimensions. An open end of the fitting portion of the first cap is press-fit into the second cap until the open end of the fitting portion of the first cap abuts against a wall of the stepped portion. This makes it possible to accurately set the air gap between the rotational speed sensor, mounted in the aperture of the second cap, and the pulser ring. Also, it prevents deformation of the first cap if the thickness of the sheet forming the first cap is small.

The fitting portion of the first cap and the fitting portion of the second cap have predetermined width dimensions. The fitting portion of the first cap is press-fit into the fitting portion of second cap until the end face of the fitting portion of the first cap abuts against the bottom portion of the second cap. This also makes it possible to accurately set the air gap between the rotational speed sensor, mounted in the aperture of the second cap, and the pulser ring. Also, it prevents deformation of the first cap if the thickness of the sheet forming the first cap is small.

The fitting portion of the first cap and the fitting portion of the second cap have predetermined width dimensions. The fitting portion of the second cap is press-fit into the fitting portion of first cap until the end face of the fitting portion of the second cap abuts against the disk portion of the first cap. This also makes it possible to accurately set the air gap between the rotational speed sensor, mounted in the aperture of the second cap, and the pulser ring. Also, it prevents deformation of the first cap if the thickness of the sheet forming the first cap is small.

The second cap has a flange portion formed as a double bent portion. The double bent portion extends radially outward from the fitting portion. The double bent portion closely contacts against the inboard-side end face of the outer member. The fitting portion of the first cap and the fitting portion of the second cap have predetermined width dimensions. The fitting portion of the first cap is press-fit onto the fitting portion of second cap until the open end of the fitting portion of the first cap abuts against the side surface of the flange portion. The second cap is press-fit into the outer member until the side surface of the flange portion abuts against the end face of the outer member. This also makes it possible to accurately set the air gap between the rotational speed sensor mounted in the aperture of the second cap, and the pulser ring. Also, it prevents deformation of the first cap if the thickness of the sheet forming the first cap is small.

The elastic members of synthetic rubber are integrally adhered by vulcanized adhesion to the connected portion between the fitting portion of the first cap and the fitting portion of the second cap. The elastic member is elastically deformed and press-contacted with the fitting surface of the outer member. The elastic member is elastically deformed and closely contacted to the fitting portion of the first cap. This makes it possible to improve the sealability of the first cap.

The wheel bearing apparatus has an outer member integrally formed on its inner circumference with double row outer raceway surfaces. An inner member includes a wheel hub and at least one inner ring. The wheel hub is integrally formed, on its one end, with a wheel mounting flange. A cylindrical portion axially extends from the wheel mounting flange. The inner ring is press-fit onto the cylindrical portion of the wheel hub. The inner member is formed on its outer circumference with double row inner raceway surfaces that oppose the double row outer raceway surfaces. Double row rolling elements are contained between the inner raceway surfaces and outer raceway surfaces of the inner member and outer member. A pulser ring is adapted to be fit onto the outer circumference of the inner ring. The pulser ring has magnetic characteristics alternately and equidistantly varying along its circumferential direction. A cup-shaped second cap, press-formed from steel sheet, is fit on the inboard-side end of the outer member. A rotational speed sensor is mounted at a radially outer position on the second cap. The rotational speed sensor is arranged opposite to the pulser ring, via a predetermined axial air gap. A cup-shaped first cap is press-fit into the inner circumference of an inboard-side end of the outer member, via a predetermined interference. The first cap is press-formed from non-magnetic austenitic stainless steel sheet. A first cap cylindrical fitting portion is press-fit into the inner circumference of the inboard-side end of the outer member. A disk portion extends radially inward from the fitting portion and opposes the pulser ring, via a small axial gap. The rotational speed sensor is arranged opposite to the pulser ring, via the first cap. The speed sensor abuts against or is close to the disk portion of the first cap. The second cap is press-fit into the inner circumference of an inboard-side end of the outer member, via a predetermined interference. Thus, it is possible to provide a wheel bearing apparatus with reliability that can achieve improved detection accuracy and sealability by increasing the rigidity of the second cap.

DRAWINGS

The drawings described herein are for illustrative purposes only of selected embodiments and not all possible implementations, and are not intended to limit the scope of the present disclosure.

FIG. 4(a) is a longitudinal-section view of the first cap.

FIG. 4(b) is a longitudinal-section view of the second cap.

FIG. 6(a) is a partially enlarged view of a fitting portion of the second cap of FIG. 1.

FIG. 6(b) is a partially enlarged view of a modification of FIG. 6(a).

DETAILED DESCRIPTION

A wheel bearing apparatus has an outer member integrally formed, on its outer circumference, with a body mounting flange to be mounted on a body of a vehicle. The outer member inner circumference has double row outer raceway surfaces. An inner member includes a wheel hub and an inner ring. The wheel hub is integrally formed, on its one end, with a wheel mounting flange. A cylindrical portion axially extends from the wheel mounting flange. The inner ring is press-fit onto the cylindrical portion of the wheel hub. The inner member is formed, on its outer circumference, with double row inner raceway surfaces opposite to the double row outer raceway surfaces. Double row rolling elements are contained between the inner raceway surfaces and outer raceway surfaces of the inner member and outer member. A magnetic encoder is press-fit onto the inner ring. A cup-shaped second cap, press-formed of steel sheet, is fit on the inboard-side end of the outer member. A rotational speed sensor is mounted at a radially outer position on the second cap. The rotational speed sensor is arranged opposite to the pulser ring, via a predetermined axial air gap. A cup-shaped first cap is press-fit into the inner circumference of an inboard-side end of the outer member, via a predetermined interference. The first cap is press-formed from non-magnetic austenitic stainless steel sheet. The first cap includes a cylindrical fitting portion press-fit into the inner circumference of the inboard-side end of the outer member. A disk portion extends radially inward from the fitting portion. The disk portion opposes the pulser ring, via a small axial gap. A bottom portion extends radially inward from the disk portion, via a bent portion, and covers the inboard-side end of the inner member. The rotational speed sensor is arranged opposite to the magnetic encoder, via the first cap. The speed sensor abuts against or is close to the disk portion of the first cap. The second cap is press-fit into a fitting surface, formed via a stepped portion, via a predetermined interference.

Preferred embodiments of the present disclosure will be described with reference to the accompanied drawings.

Figure 1:
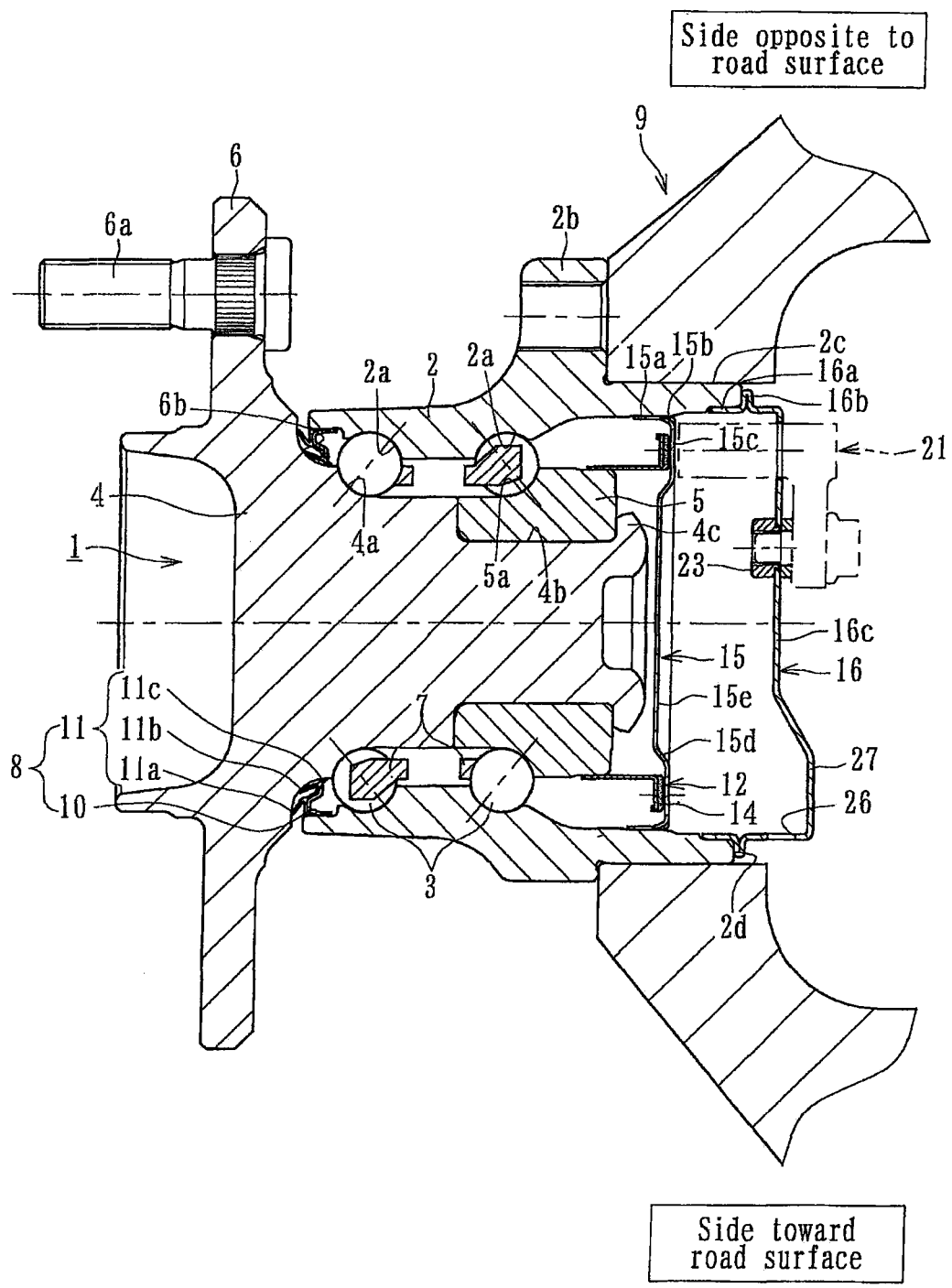
FIG. 1 is a longitudinal-section view of a first embodiment of a wheel bearing apparatus.
Figure 2:
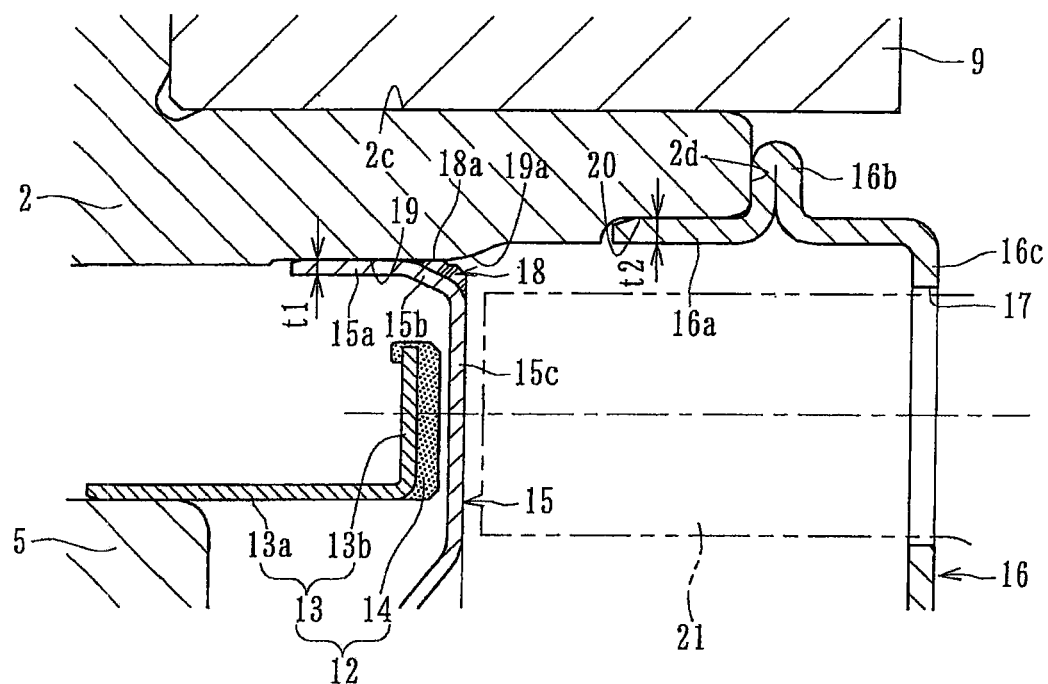
FIG. 2 is a partially enlarged view of a detecting portion of FIG. 1.
Figure 3:
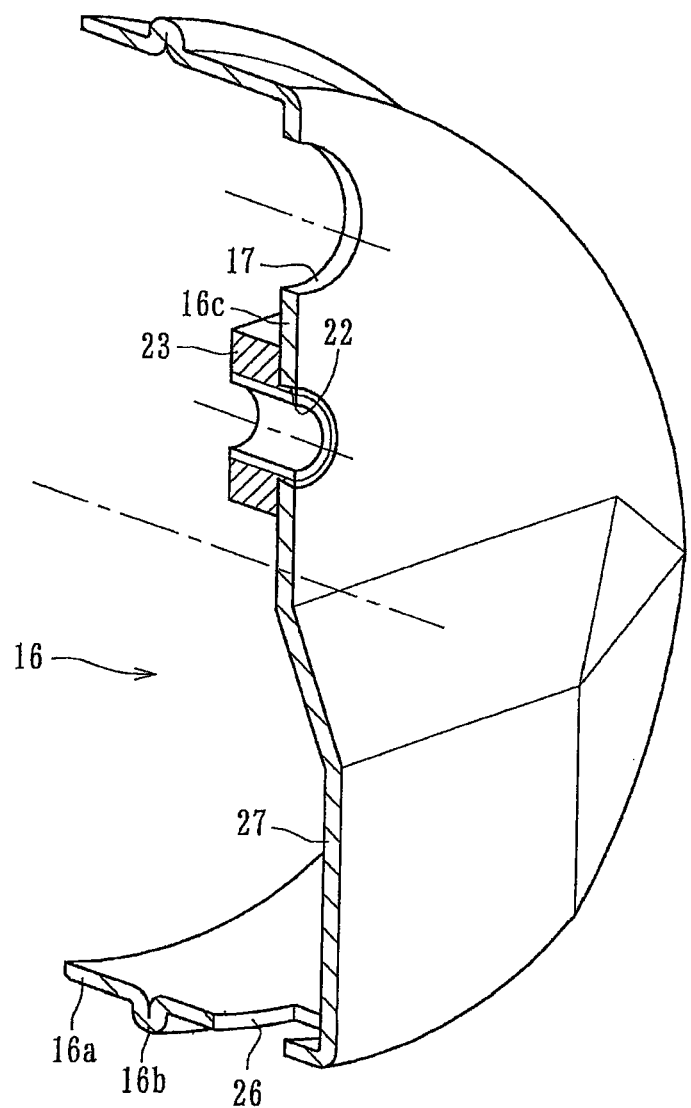
FIG. 3 is a partially perspective view of a second cap of FIG. 1.
Figure 5:
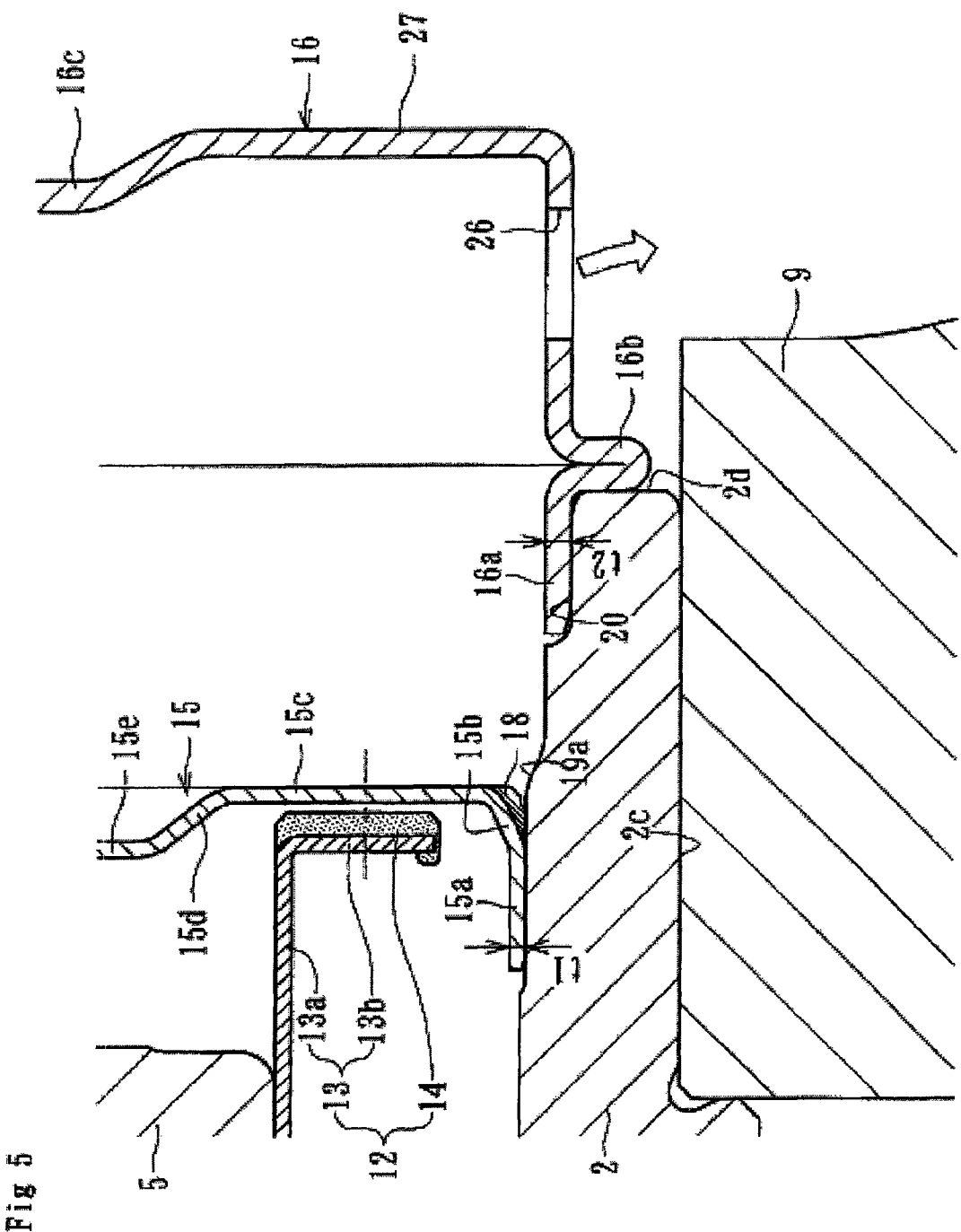
FIG. 5 is a partially enlarged view of a drain portion of FIG. 1.
Figure 7:
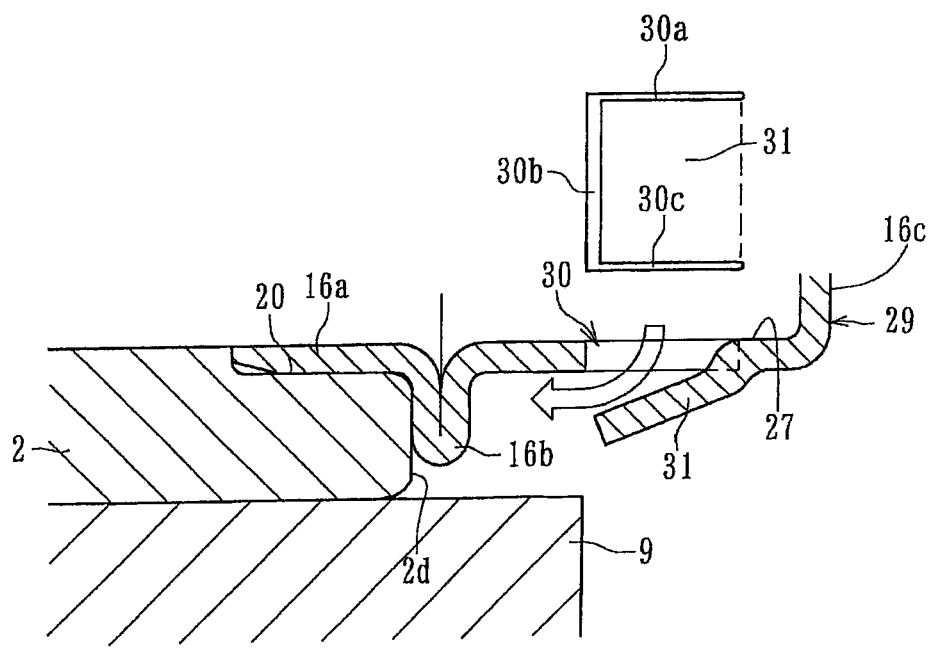
FIG. 7 is a partially enlarged view of a modification of the second caps of FIG. 6.
Figure 8:
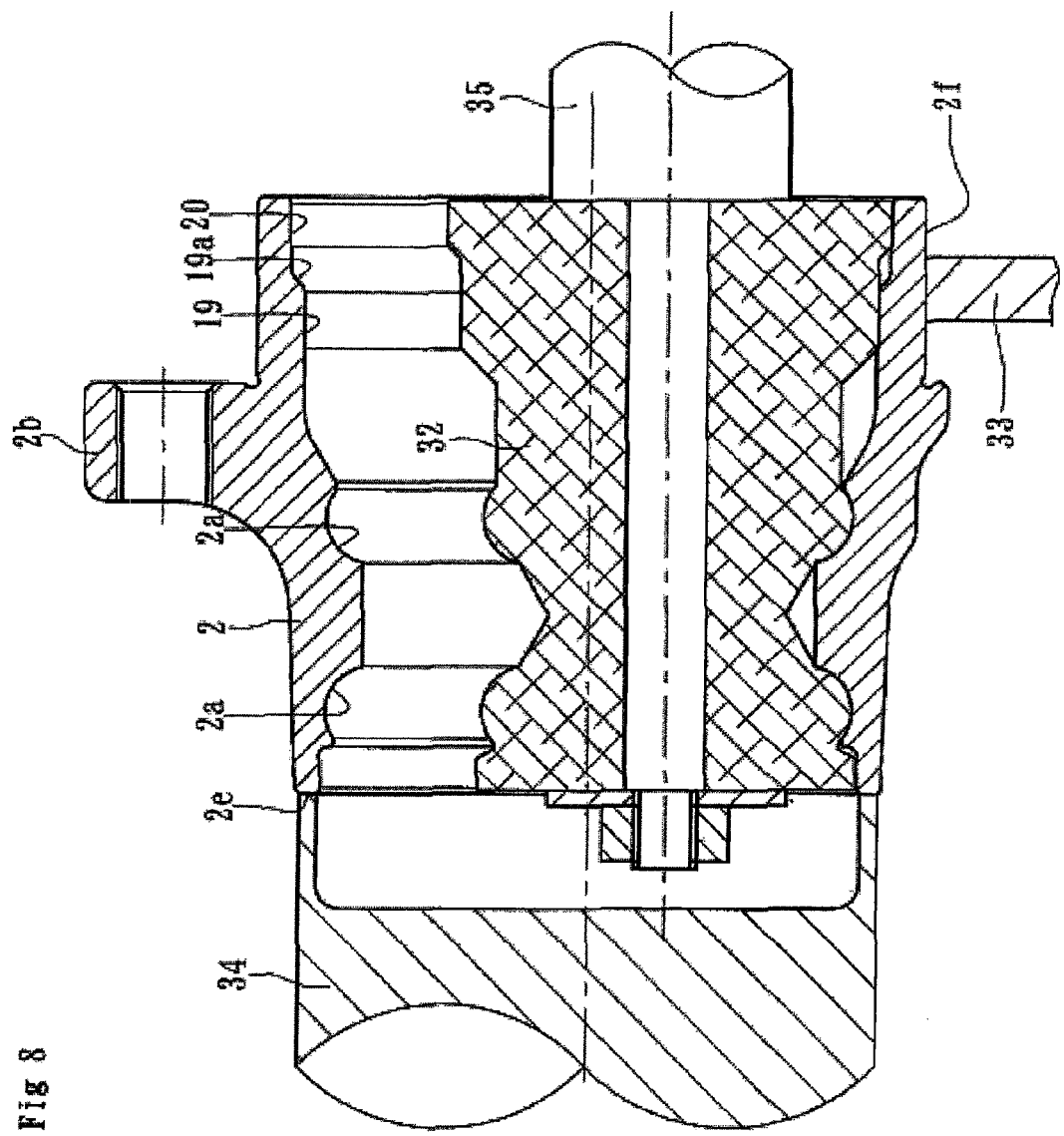
FIG. 8 is an explanatory view of a grinding method of the outer member of the wheel bearing apparatus.
Figure 9:
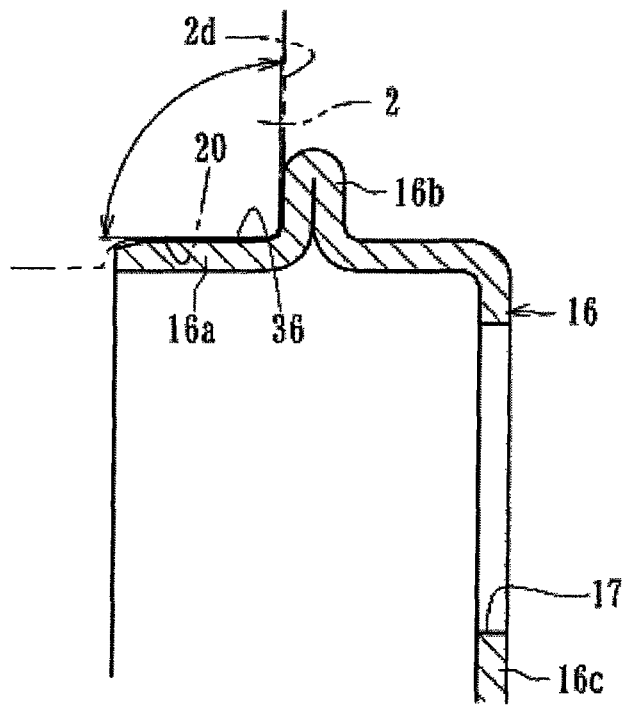
FIG. 9(a) is a partially enlarged view of a fitting portion of the second cap of FIG. 1.
FIG. 9(b) is a partially enlarged view of a modification of FIG. 9(a).
Figure 9:
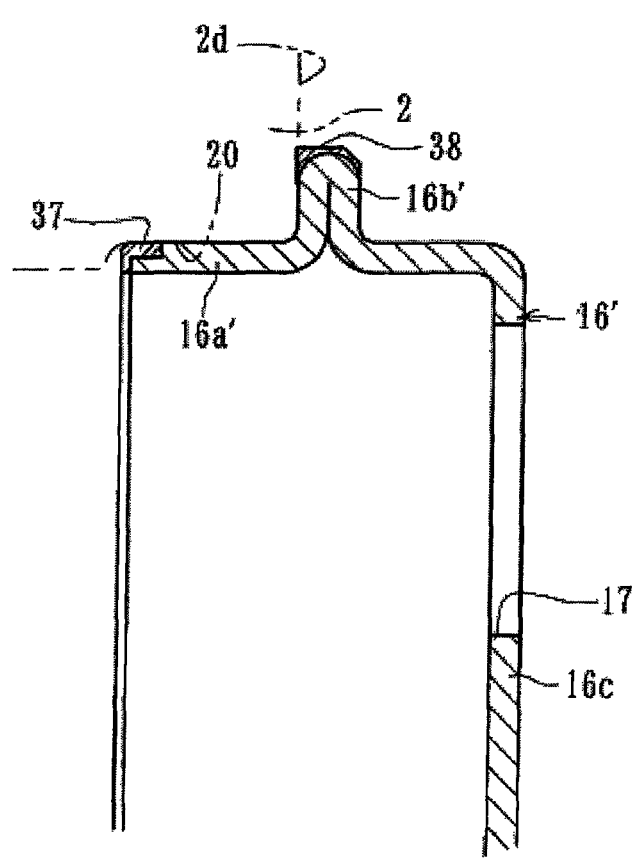

FIG. 1 is a longitudinal-section view of a first embodiment of a wheel bearing apparatus. FIG. 2 is a partially enlarged view of a detecting portion of FIG. 1. FIG. 3 is a partially perspective view of a second cap of FIG. 1. FIG. 4(a) is a longitudinal-section view of the first cap. FIG. 4(b) is a longitudinal-section view of the second cap. FIG. 5 is a partially enlarged view of a drain portion of FIG. 1. FIG. 6(a) is a partially enlarged view of a fitting portion of the second cap of FIG. 1. FIG. 6(b) is a partially enlarged view of a modification of FIG. 6(a). FIG. 7 is a partially enlarged view of a modification of the second cap of FIG. 6. FIG. 8 is an explanatory view of a grinding method of the outer member of the wheel bearing apparatus. FIG. 9(a) is a partially enlarged view of a fitting portion of the second cap of FIG. 1. FIG. 9(b) is a partially enlarged view of a modification of FIG. 9(a). In the description below, the outer-side of the wheel bearing apparatus, when it is mounted on a vehicle, is referred to as the "outboard-side" (a left-side in drawings). The inner-side of the wheel bearing apparatus, when it is mounted on a vehicle, is referred to as the "inboard-side" (a right-side in drawings).

The wheel bearing apparatus of FIG. 1 is a so-called "third generation" type for a driven wheel. It includes an inner member 1, an outer member 2, and double row rolling elements (balls) 3, 3 contained between the inner and outer members 1 and 2. The inner member 1 includes a wheel hub 4 and an inner ring 5 press-fit onto the wheel hub 4.

The wheel hub 4 is integrally formed, on its outboard-side end, with a wheel mount flange 6 to mount a wheel (not shown). The wheel hub outer circumference includes one (i.e. outboard-side) inner raceway surface 4a. A cylindrical portion 4b axially extends from the raceway surface 4a. Hub bolts 6a are secured on the wheel mounting flange 6 at circumferentially equidistant positions.

The inner ring 5 is formed, on its outer circumference, with the other (i.e. inboard-side) inner raceway surface 5a. The inner ring 5 is press-fit onto the cylindrical portion 4b of the wheel hub 4. This forms a double row angular contact ball bearing of back-to-back duplex type. The inner ring 5 is axially secured on the wheel hub 4 by a caulked portion 4c. The caulked portion 4c is formed by plastically deforming the end of the cylindrical portion 4b. This reduces both weight and size of the wheel bearing apparatus. The inner ring 5 and balls 3, 3 are formed of high carbon chrome steel such as SUJ2. They are dip hardened to their cores to have a hardness of 58~64 HRC.

The wheel hub 4 is made of medium-high carbon steel such as S53C including carbon of 0.40~0.80% by weight. It is hardened by high frequency induction hardening to have a surface hardness of 58~64 HRC over a region from an inboard-side base 6b of the wheel mounting flange 6, forming a seal land portion of a seal 8, to the cylindrical portion 4b, including the inner raceway surface 4a. The caulked portion 4c is not hardened so as to keep the surface hardness after forging. Accordingly, it is possible to have sufficient mechanical strength against rotary bending loads applied to the wheel mounting flange 6. Thus, this improves the anti-fretting property of the cylindrical portion 4c, where the inner ring 5 is press-fit, and smoothly performs the bending working of the caulking portion 4c without causing generation of micro cracks.

The outer member 2 is formed, on its outer circumference, with body mounting flange 2b. The mounting flange 2b is to be mounted on a knuckle 9. The inboard-side of the body mounting flange has a cylindrical pilot portion 2c, to be fit into the knuckle 9. The outer member is also formed, on its inner circumference, with double row outer raceway surfaces 2a, 2a. The outer raceway surfaces 2a, 2a correspond, respectively, to the double row inner raceway surfaces 4a, 5a of the wheel hub 4 and the inner ring 5. The double row rolling elements 3, 3 are contained between the outer and inner double row outer raceway surfaces 2a, 2a; 4a, 5a. The rolling elements 3, 3 are rollably held by cages 7, 7. A seal 8 is mounted on the outboard-side annular opening formed by the outer member 2 and the inner member 1. A first cap 15 (i.e. internal cap), later described more in detail, is mounted on the inboard-side opening. The first cap 15 prevents leakage of lubricating grease sealed within the bearing and entry of rain water or dust from the outside into the bearing.

Similarly to the wheel hub 4, the outer member 2 is formed of medium-high carbon steel such as S53C including carbon of 0.40~0.80% by weight. The outer raceway surfaces 29, 29 are hardened by high frequency induction hardening to have a surface hardness of 58~64 HRC.

The outboard-side seal 8 is formed as a united seal. It has a metal core 10 press-fit into the outboard-side end of the outer member 2. A sealing member 11 is adhered to the metal core 10, via vulcanized adhesion. The metal core 10 is press-formed of austenitic stainless steel sheet (JIS SUS 304 etc) or cold rolled steel sheet (JIS SPCC etc.). It has a L-shaped cross-sectional configuration. On the other hand, the sealing member 11 is formed of synthetic rubber such as NBR (acrylonitrile-butadiene rubber) etc. It comprises a side lip 11a, a dust lip 11b and a grease lip 11c. The sealing member 11 covers the outer surface of the metal core 10 and forms a so-called half metal structure. This protects the inside of the wheel bearing apparatus by increasing the sealability.

There are examples of material of the sealing ring 11 other than NBR, such as HNBR (hydrogenation acrylonitric-butadiene rubber), EPDM (ethylene propylene rubber), ACM (poly-acrylic rubber) superior in heat and chemical resistance, FKM (fluororubber) or silicone rubber.

Although the wheel bearing apparatus is shown here formed by a double row angular contact ball bearing using balls as the rolling elements 3, 3, the present disclosure is not limited to such a bearing and may be a double row tapered roller bearing, using tapered rollers as rolling elements 3.

A pulser ring 12 is press-fit onto the outer circumference of the inner ring 5. As shown in an enlarged view of FIG. 2, the pulser ring 12 includes an annular supporting member 13 and a magnetic encoder 14. The magnetic encoder 14 is integrally adhered to the inboard-side surface of the annular supporting member 13, via vulcanized adhesion. The magnetic encoder 14 is formed of elastomer such as synthetic rubber with mingled ferritic magnetic powder so that N and S poles are alternately arranged along its circumference. This forms a rotary encoder to detect the rotation of a wheel.

The annular supporting member 13 is press-formed of a steel plate such as ferritic stainless steel sheet (JIS SUS 430 etc.) or rust-prevented cold rolled steel sheet. It has an L-shaped cross-section. A cylindrical portion 13a is press-fit onto the outer circumference of the inner ring 5. A standing portion 13b extends radially outward from the cylindrical portion 12a. The magnetic encoder 14 is integrally adhered to the inboard-side surface of the standing portion 13b.

As shown in FIG. 1, the inboard-side opening of the outer member 2 is closed by the first cap 15 press-fit into the inner circumference of inboard-side end of the outer member 2. The first cap 15 has anti-corrosion property. The first cap 15 is formed from non-magnetic steel sheet such as austenitic stainless steel sheet. The first cap 15 has a cup-shape in order to prevent adverse detecting performance of the rotational speed sensor 21. As shown in FIG. 4(a), the first cap 15 includes a cylindrical fitting portion 15a, a disk portion 15c and a radially reduced portion 15b. The cylindrical fitting portion 15a is press-fit into the inner circumference of the inboard-side end of the outer member 2. The disk portion 15c extends radially inward from the fitting portion 15a, via a radially reduced portion 15b. The disk portion 15c opposes the magnetic encoder 14, via a small axial gap. A bottom portion 15e extends from the disk portion 15c, via a bent portion 15d, to cover the inboard-side end of the inner member 1.

In this embodiment, an elastic member 18, of synthetic rubber such as NBR, is integrally adhered to the radially reducing portion 15b of the first cap 15 by vulcanized adhesion, as shown in FIG. 2. The elastic member 18 is arranged so that it does not project toward the inboard-side from the side of the disk portion 15c so as not to interfere with the rotational speed sensor 21. The annular projection 18a projects radially outward from the fitting portion 15a. The fitting surface 19, of the inner circumference of the inboard-side end of the outer member 2, is formed so that the amplitude of chatter vibration in machining is limited to 3 µm or less. The annular projection 18a is elastically deformed and tightly contacted by the end inner circumference of the outer member 2 when the first cap 15 is press-fit into the outer member 2. This forms the half metal structure in order to improve the sealability of the fitting portion 15a.

A second cap (e.g., a sensor cap external of the first cap 15) 16 is also mounted on the outer member 2 inboard-side from the first cap 15. More particularly, a second annular fitting surface 20 is formed, via a stepped portion 19a, inboard-side from the first fitting surface 19 of the outer member 2. The second cap 16 is press-fit into the second fitting surface 20, via a predetermined interference.

The second cap 16 is formed of rust-preventing and cold-rolled steel sheet. The second cap 16 has a cup-shape and, as shown in FIGS. 3 and 4(b), a cylindrical fitting portion 16a, a flange portion 16b, and bottom portion 16c. The cylindrical fitting portion 16a is inserted into the inner circumference 20 of the inboard-side end of the outer member 2. The flange portion 16b is formed as a double bent portion that extends radially outward from the fitting portion 16a. The flange portion 16b is adapted to closely contact against the inboard-side end face 2d of the outer member 2. The bottom portion 16c extends radially inward from the flange portion 16b to enclose an inboard-side opening of the outer member 2. An insert aperture 17 is formed in the bottom portion 16c. The aperture 17 is at a position corresponding to the pulser ring 12. The rotational speed sensor 21 is inserted and mounted in the aperture 17. The second cap 16 is formed with the flange portion 16b that closely contacts the end face 2d of the outer member 2. Thus, it is possible to increase the rigidity of the second cap and improve the positioning accuracy of the rotational speed sensor. In addition, since the rotational speed sensor 21 is mounted in the horizontally positioned insert aperture 17, it is possible to suppress air gap variation between the rotational speed sensor 21 and the pulser ring 12. This obtains stable detection accuracy even if the outer member 2 and the inner member 1 would be relatively inclined by a lateral load applied to them from a wheel.

A securing nut 23 is secured in an aperture 22 formed on the second cap 16 by caulking at the center of the second cap 16 and outboard-side of its bottom portion 16c. The securing nut may be secured on the second cap 16 e.g. by welding, adhesion or press-fitting. The rotational speed sensor 21, mounted in the aperture 17 of the second cap 16, is secured on the second cap 16 by fastening a bolt 25 into the nut 23, via a mounting member 24. The securing nut 23 is secured on the outboard-side surface of the bottom portion 16c of the second cap 16. The nut 23 can be pulled into the outboard-side surface of the bottom portion 16c when the bolt 25 is fastened. Thus, the rotational speed sensor 21 can be firmly secured on the second cap 16 by simply fastening the nut 23.

The rotational speed sensor 21 includes an IC incorporated with a magnetic detecting element and a wave form shaping circuit. The magnetic detecting element may be a Hall element, a magnetic resistance elements (MR elements) etc. to vary characteristics in accordance with flow of magnetic fluxes. The waveform shaping circuit shapes output waveforms and forms part of the anti-lock brake system (ABS) of an automobile to detect and control the rotational speed of a wheel. The rotational speed sensor 21 is arranged opposite to the pulser ring 12, via the first cap 15. The speed sensor 21 is inserted until the tip of the sensor 21 abuts against or is close to the disk portion 15c of the first cap 15. (FIG. 2) This makes it possible to provide a wheel bearing apparatus that can obtain a desirable air gap. This improves the assembling workability while eliminating complicated air-gap adjustment. Also, it surely seals the inside of the wheel bearing apparatus by the first cap 15 provided with the elastic member 18 on the radially reducing portion 15b.

The second cap 16 is formed with a rust-preventing film by a rust-preventing coating by a cation electro-deposition coating. Although the cation electro-deposition coating is performed by connecting articles to a negative electrode, anion electro-deposition coating where articles are connected to a positive electrode may be used. The anion electro-deposition coating is characterized in that colors of the coating are stable and the deposition temperature can be set low. However, the cation electro-deposition coating of epoxy resin is more preferable due to its superior anti-rust-preventing power and adhesion power of the coating.

According to the present disclosure, phosphorus acid zinc processing is carried out on the surface of the second cap 16 as a base process (preprocessing) of the cation electro-deposition. The phosphorous acid zinc process can chemically roughen a surface of steel sheet. This improves adhesion of the coating due to a strong bite of coating into the surface of the second cap. Sealer treatment may be additionally performed after the phosphorous acid zinc processing. The sealer is a kind of metal surface treating agent and a chemical film can be formed by performing a short-time dipping or spraying of 30 seconds through 2 minutes. With a so-called formation process, it is possible to ensure great coating sealability and to form protection coating of the material. This exerts strong anti-rust functions and improves conductivity. That is, it is possible to prevent entrapment of air during the electro-deposition of the coating due to smoothing of the micro surface of the phosphorous acid zinc coating by performing the phosphorus acid zinc process as a base process of the cation electro-deposition and additional sealer treatment. The entrapment of air into coating would cause surface defects (irregularity in the surface) such as uneven undulations and is not preferable.

The surface of the second cap 16 is formed by a rust-preventing coating by cation electro-deposition and phosphorous acid zinc treatment as its base treatment. Thus, it is possible to keep a smooth surface of the fitting surface by embedding micro irregularities. Accordingly, it is possible to prevent the generation of rust in the fitting portion 16a of the second cap 16 for a long term. Thus, this obtains good sealability in the fitting portion between the second cap 16 and the second fitting surface 20 and end face 2d of the outer member 2.

A thickness t1 of the first cap 15 is set smaller than a thickness t2 of the second cap 16. More particularly, the thickness t2 of the second cap 16 is set to 1.0~1.5 mm. The thickness t1 of the first cap 15 is set to 0.2~1.0 mm. This makes it possible to set the air gap smaller. Thus, this improves the detecting accuracy. In addition, it is possible to reduce the weight of the wheel bearing apparatus and its manufacturing cost. When the thickness t1 is less than 0.2 mm, it is difficult to accurately form the first cap 15. On the contrary, when the thickness t1 exceeds 1.0 mm, the air gap will be increased. Thus, desirable magnetic characteristics necessary for accurate detection cannot be obtained.

A drain 26 is formed on the bottom portion 16c of a bulged portion 27 of the second cap 16 at its region near the ground as shown in FIG. 3 and FIG. 4(b). The bulged portion 27 projects toward the inboard-side from the bottom portion 16c, by a predetermined distance L. The bulged portion 27 is effective when the knuckle 9 projects toward the inboard-side from the end face 2d of the outer member 2 as shown in FIG. 5. However, the bulged portion 27 is not effective when it is flush with the end face 2d of the outer member. Accordingly, by forming the drain 26 in the bulged portion 27 in a radially cut-through manner, it is possible to effectively discharge foreign matter to the outside. This occurs without disruption by the knuckle 9 of a vehicle even when the foreign matter, such as rain water, enters into the second cap 16.

A depth of the second fitting surface 20 of the outer member 2 is set larger than the thickness t2 of the second cap 16 as shown in FIG. 6(a). This makes it possible to smoothly discharge foreign matter that enters in the second cap 16 to the outside through the drain 26.

As shown in FIG. 6(b), it is preferable that the inner circumference 28, between the first fitting surface 19 and the second fitting surface 20 of the outer member 2 is formed as a tapered surface. The tapered surface has its radius gradually increasing at an angle α toward the end face 2d of the outer member 2. This makes it possible to more smoothly guide foreign matter that enters within the second cap 16 to the bulged portion 27 without resistance.

FIG. 7 is a second cap 29 that is a modification of the previously described second cap 16. Similar to the second cap 16, the second cap 29 includes a cylindrical fitting portion 16a to be inserted into the inner circumference 20 of the inboard-side end of the outer member 2. It is press-formed from rust-prevented cold-rolled steel sheet into a cup shape. A flange portion 16b, formed as a double bent portion, extends radially outward from the fitting portion 16a. The flange portion is adapted to closely contact against the inboard-side end face 2d of the outer member 2. A bottom portion 16c extends radially inward from the flange portion 16b. The bottom portion 16c includes an inboard-side opening of the outer member 2. This second cap 29 is different from the previous second cap 16 basically only in structure of the drain 30.

Similar to the previously described second cap 16, drain 30 is also formed in the bulged portion 27 of the second cap 29. However, the drain 30 is formed as a rectangular tongue shape by three punched slits 30a, 30b, 30c. It is bent radially outward toward the ground. The bent tongue 31 forms a protecting wall to prevent entry of muddy water or pebbles, splashed by tires, into the inside of the second cap 29. Thus, this maintains the speed detecting accuracy and improves the reliability of the ABS.

Although the second caps 29 is shown formed with a single drain 30, a plurality of drains may be formed on the second cap 29. The presence of the drain or drains enables foreign matter that enters into the second cap to be easily discharged without longtime residence of the foreign matter. Thus, this prevents structural parts from being adversely effected.

A grinding method of the outer member 2 will be described using FIG. 8. In the grinding steps, the outer member 2 is ground in regions of the double row outer raceway surfaces 2a, 2a, the first fitting surface 19 and the second fitting surface 20. The second fitting surface 20 is formed on the inner circumference of the outer member 2 at a further inboard-side from the first fitting surface 19, via a stepped portion 19a. The first cap is press fit on the first fitting surface 19. The second cap (not shown) is press-fit onto the second fitting surface 20. The double row outer raceway surfaces 2a, 2a, the first fitting surface 19 and the second fitting surface 20 are simultaneously ground by a formed grinding wheel 32 in the grinding steps after the heat treatment step, with high frequency induction quenching.

The grinding is performed by rotating the formed grinding wheel 32 in one direction to have desired configurations and dimensions. This occurs under conditions where a shoe 33, for centering the outer member 2, is slide-contacted with the inboard-side outer circumference 2f of the outer member 2. A backing plate 34 abuts against the outboard-side end face 2e. The formed grinding wheel 32 is previously conditioned by a rotary dresser (not shown). Thus, the grinding wheel 32 has desired configurations and dimensions. The grinding wheel 32 is positioned relative to the outer member 2 under a condition mounted on a quill 35.

The first fitting surface 19 and the second fitting surface 20 are simultaneously ground by a formed grinding wheel with the double row outer raceway surfaces 2a, 2a. Thus, it is possible to improve the accuracy in the roundness and coaxiality of each fitting surface. This improves the sealability of the fitting portions. In addition, the simultaneous grinding can reduce working steps and therefore manufacturing costs. If the outer member is formed with a single fitting surface and the first cap 15 and second cap 16 are to be fit into the single fitting surface, it is believed that the thinner first cap would be deformed during the press-fitting step. In addition, this reduces assembling workability due to an increase of the press-fitting stroke of the first cap 15. The second fitting surface 20 is formed at the inboard-side of the first fitting surface 19, via the stepped portion 19a. Thus, it is possible to suppress the press-fitting stroke to a minimum. This improves assembling workability as well as prevents deformation of the first cap during the press-fitting process. Thus, this improves the reliability of the wheel bearing apparatus.

The second cap 16 is coated with a rust-preventing coating film 36 (FIG. 9(a)) by cation electro-deposition. It is possible to cover the entire surface of the second cap 16 with the rust-preventing coating film 36. However, the rust-preventing coating film 36 may actually be arranged at abutting regions of the second cap 16 against the second fitting surface 20 and the inboard-side end surface 2d of the outer member 2 as shown in FIG. 9(a). This reduces the manufacturing cost. Although the cation electro-deposition coating is performed by connecting articles to a negative electrode, anion electro-deposition coating, where articles are connected to a positive electrode, may be used. The anion electro-deposition coating is characterized in the colors of the coating is stable and the deposition temperature can be set low. However, the cation electro-deposition coating of epoxy resin is more preferable due to its superior anti-rust-preventing power and adhesion power of the coating.

As described above, phosphorus acid zinc processing is carried out on the surface of the second cap 16 as a base processing (preprocessing) of the cation electro-deposition. The phosphorous acid zinc processing can chemically roughen a surface of steel sheet. This improves adhesion of the coating due to a strong adhesion of coating to the surface of second cap. Sealer treatment may be additionally performed after the phosphorous acid zinc processing. The sealer is a kind of metal surface treating agent. A chemical film can be formed by performing a short-time dipping or spraying of 30 seconds to 2 minutes. With a so-called formation process, it is possible to ensure great coating sealability and to form a protection coating on the material that exerts a strong anti-rust function and improved conductivity. Thus, it is possible to prevent entrapment of air during the electro-deposition of the coating due to smoothing of the micro surface by the phosphorous acid zinc coating by performing the phosphorus acid zinc process as a base processing of the cation electro-deposition and additional sealer treatment. The entrapment of air into the coating would cause surface defects such as uneven undulations. This is not preferable.

The surface of the second cap 16 is formed with rust-preventing film 36 of a cation electro-deposition at abutting regions of the second cap 16 against the second fitting surface 20 and the inboard-side end surface 2d of the outer member 2. The phosphorous acid zinc treated is a base treatment. Thus, it is possible to keep a smooth surface of the fitting surface by embedding micro irregularities. Accordingly, it is possible to prevent the generation of rust in the fitting portion 16a of the second cap 16 for a long term. This provides good sealability in the fitting portion between the second cap 16 and the second fitting surface 20 and end face 2d of the outer member 2.

Packing members 37, 38 can be adhered on the second cap 16'. This improves the sealability of the fitting portion of the second cap 16'. More particularly as shown in FIG. 9(b), the packing members 37, 38 include synthetic rubber, such as NBR. The packing members 37, 38 are integrally adhered to abutting regions between the second cap 16' and the second fitting surface 20 and the inboard-side end face 2d of the outer member 2 (half-metal structure) by vulcanized adhesion. This improves the sealability and protects the inside of the wheel bearing apparatus.

Figure 10:
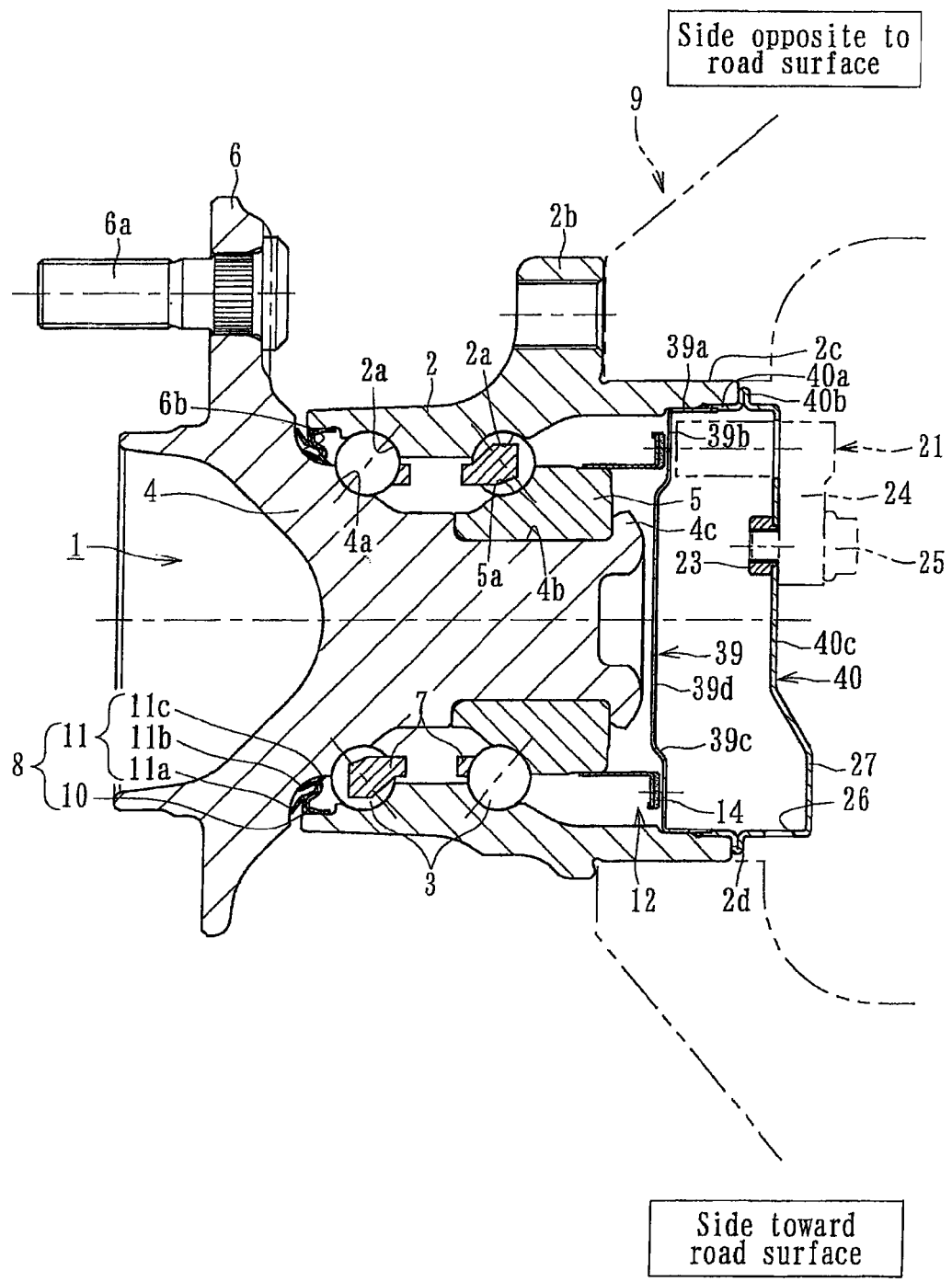
FIG. 10 is a longitudinal-section view of a second embodiment of a wheel bearing apparatus.
Figure 11:
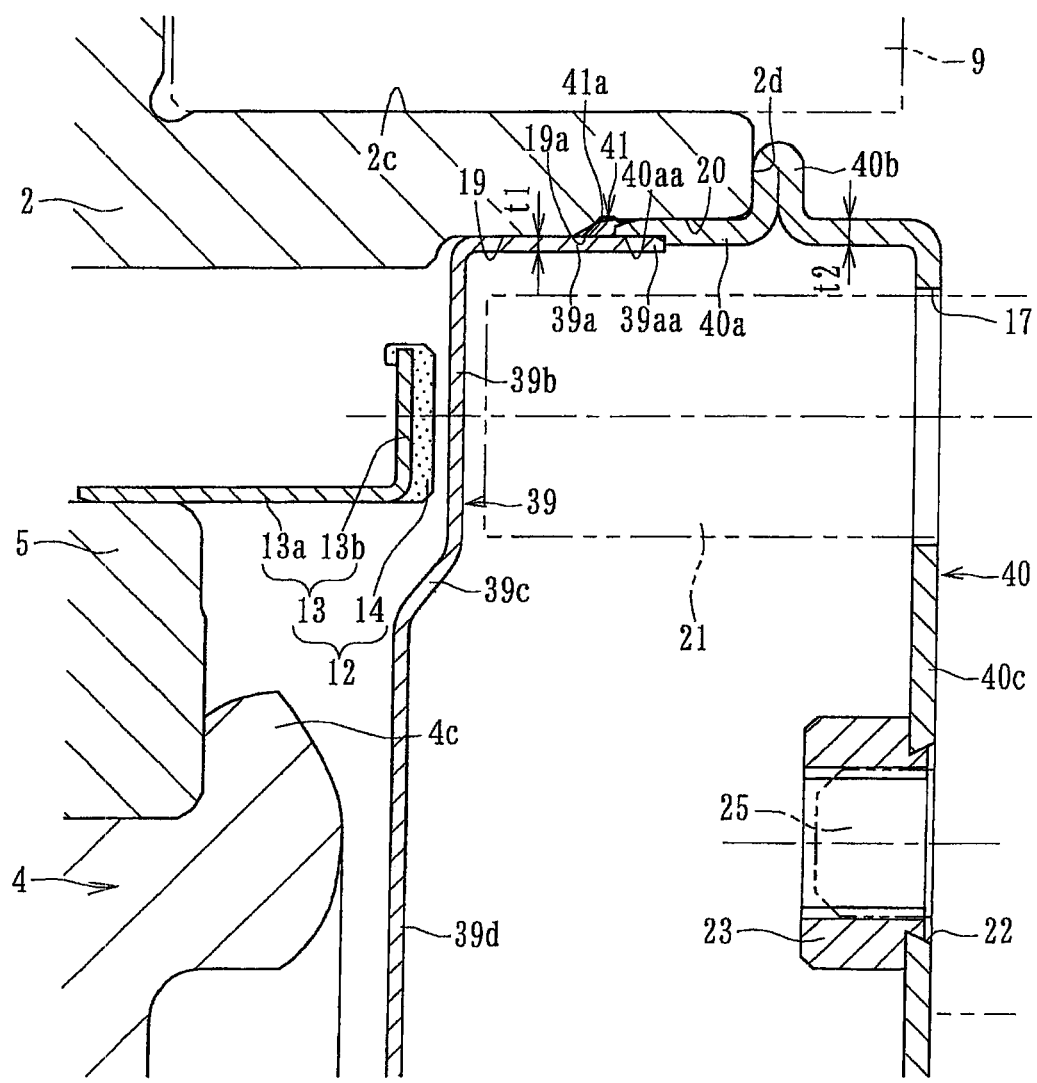
FIG. 11 is a partially enlarged view of a detecting portion of FIG. 10.
Figure 12:
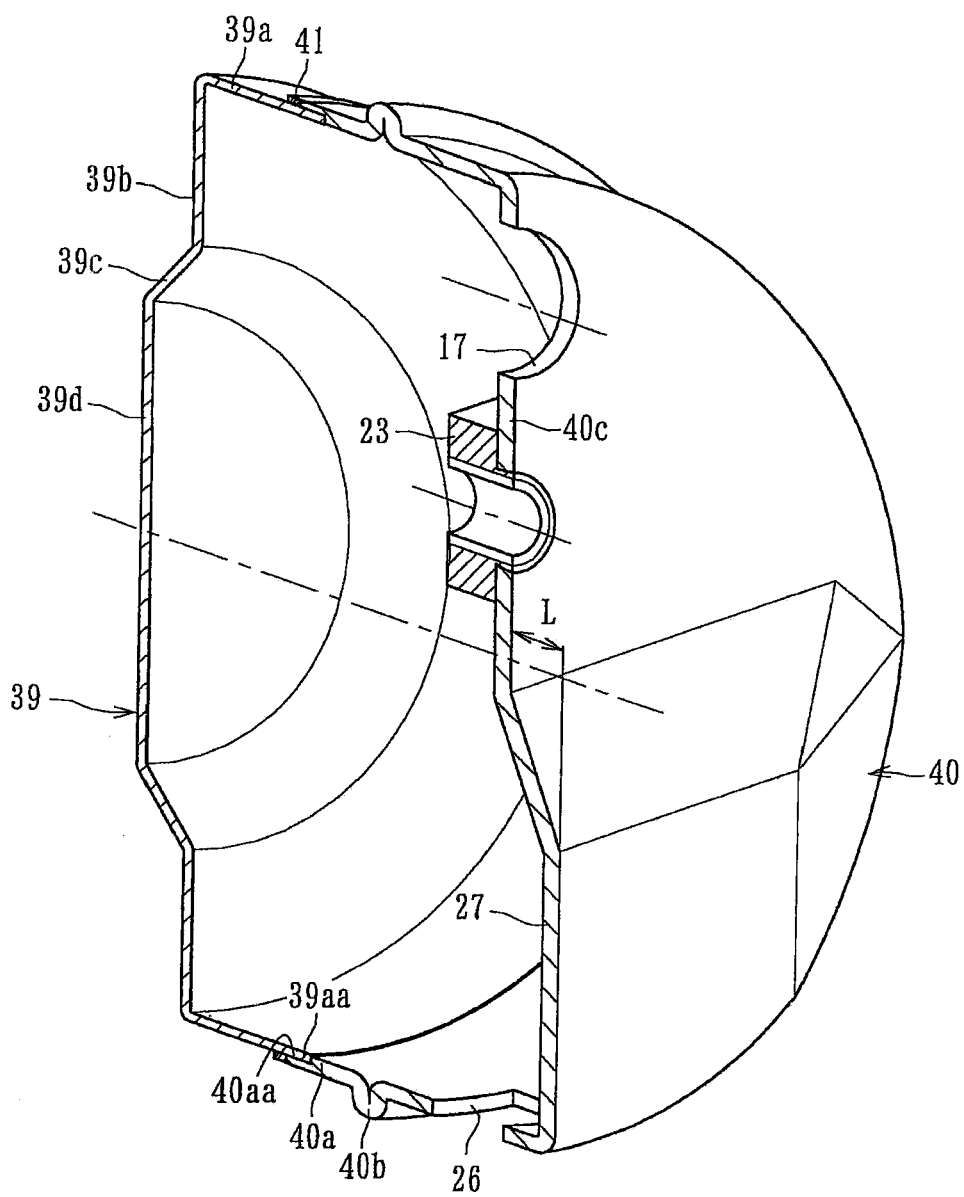
FIG. 12 is a partially enlarged perspective view of a united condition of the first cap and the second cap of FIG. 10.
Figure 13:
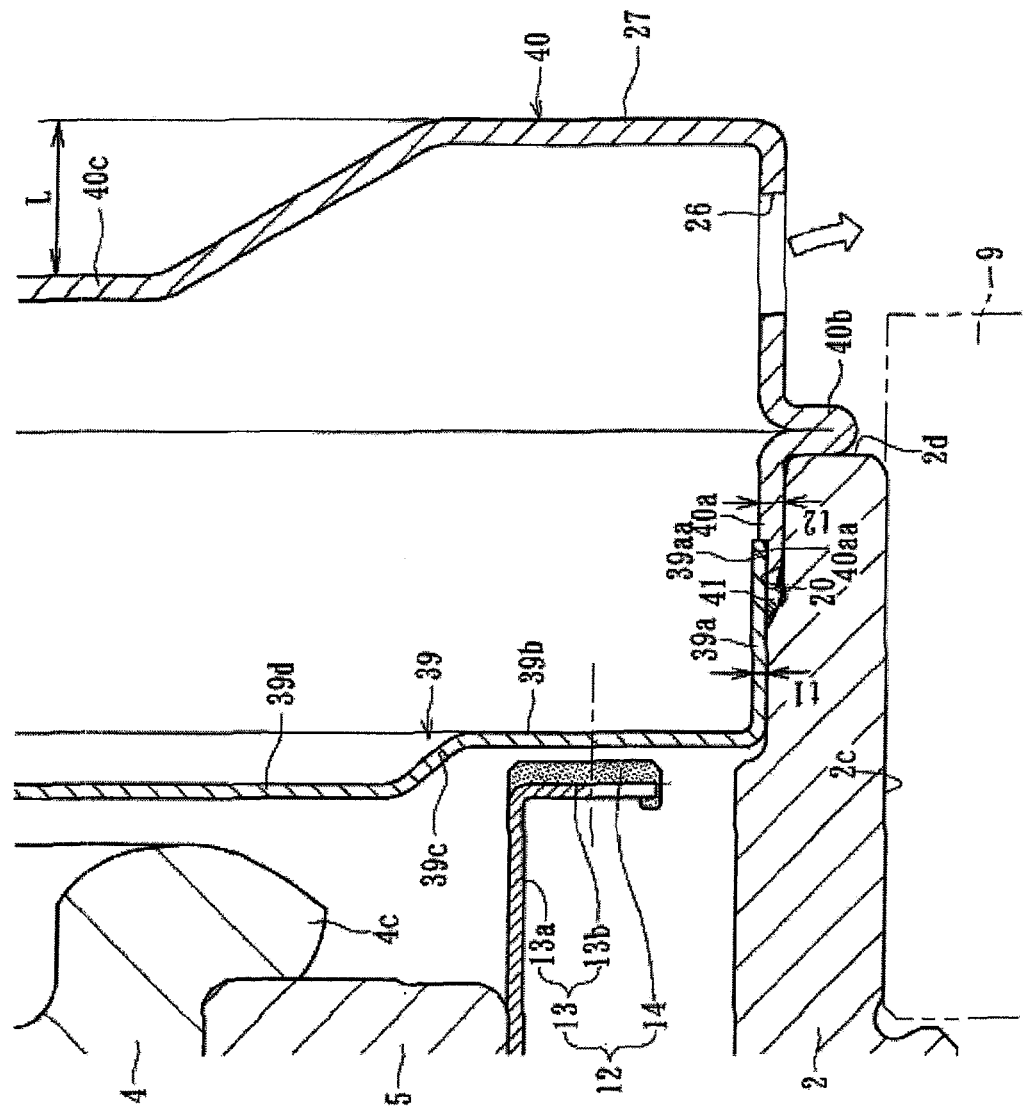
FIG. 13 is a partially enlarged view of a drain portion of FIG. 10.
Figure 14:
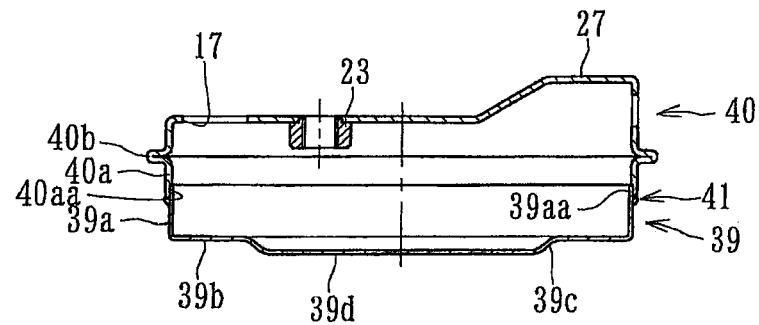
FIG. 14 is an explanatory view of an assembling method of the wheel bearing apparatus.
Figure 14:
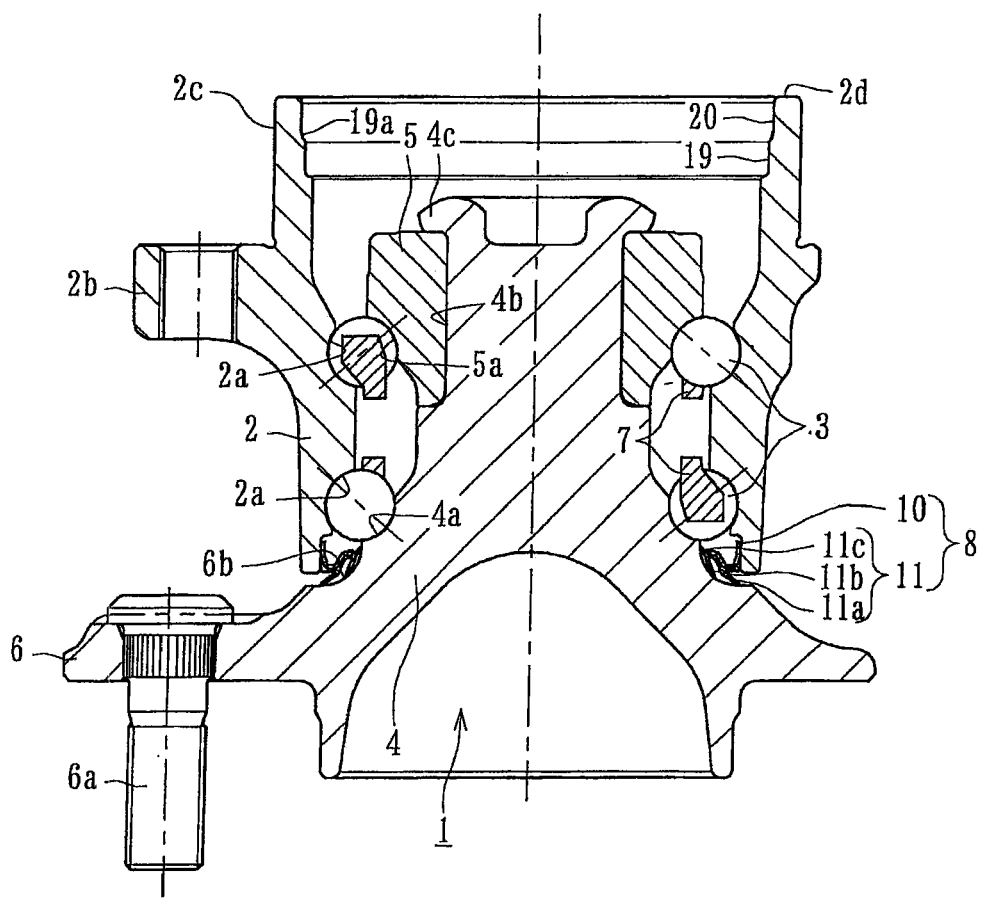
Figure 15A:
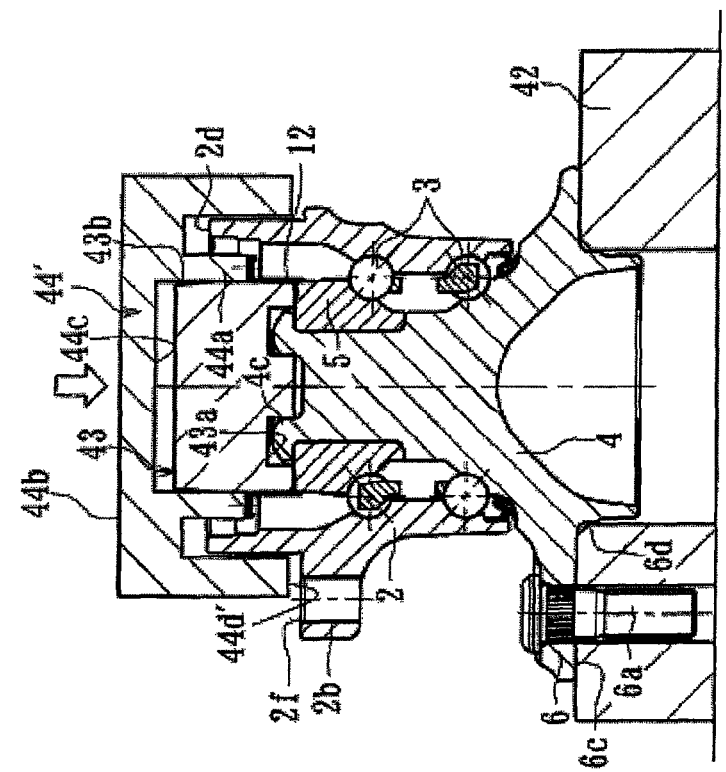
FIG. 15(a) is an explanatory view of an assembling method of a pulser ring of FIG. 14.
Figure 15B:
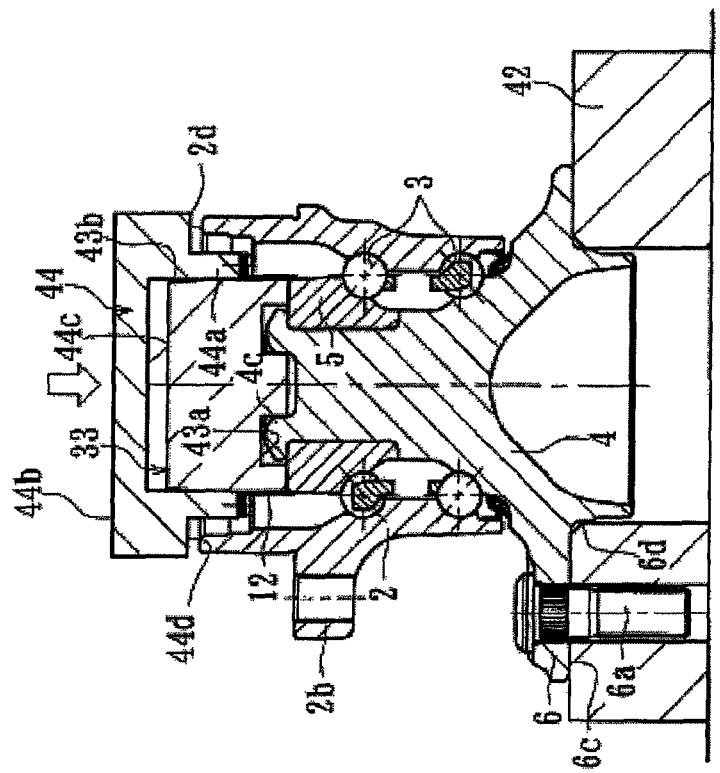
FIG. 15(b) is an explanatory view of a modification of FIG. 15(a).
Figure 16:
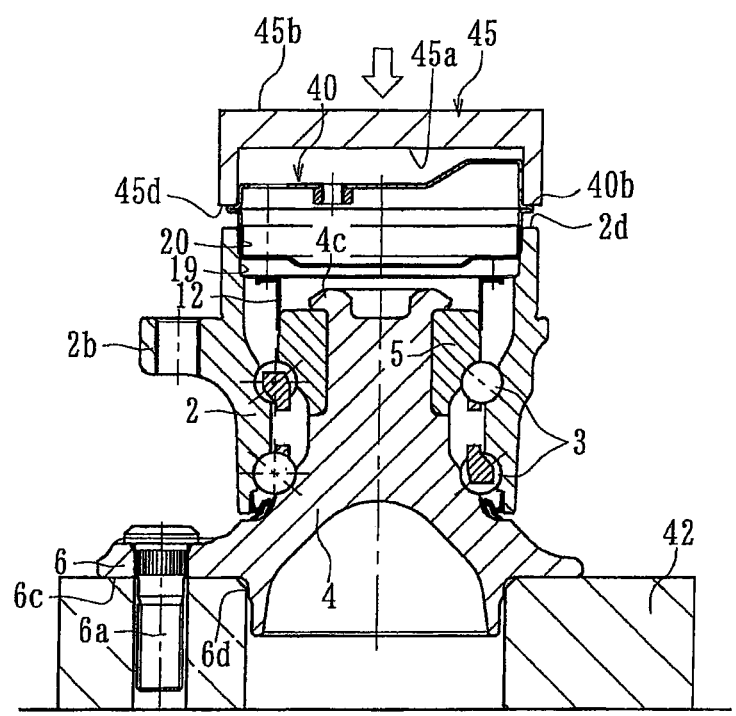
FIG. 16 is an explanatory view of an assembling method of the first and second caps of FIG. 14.
Figure 17A:
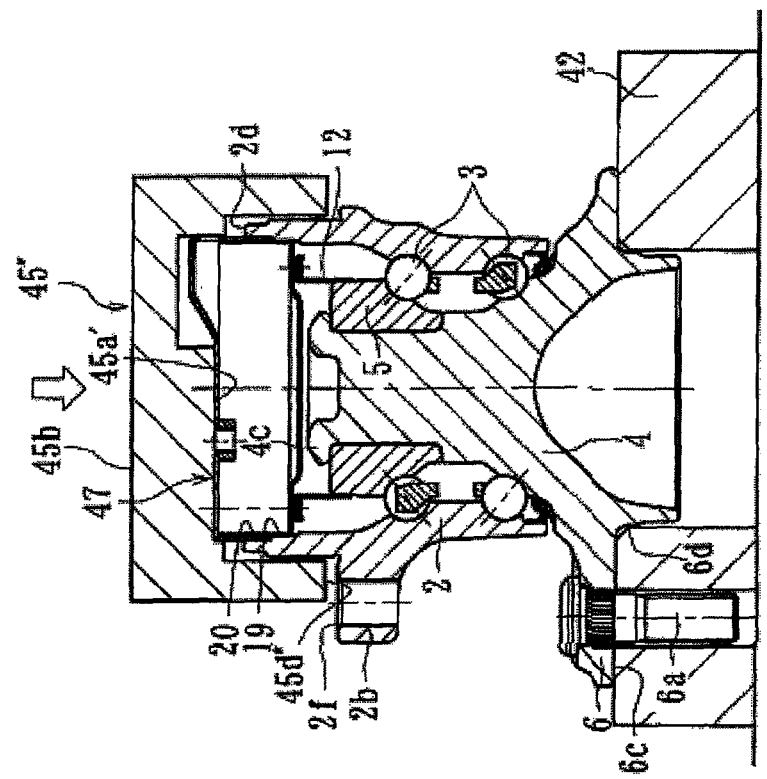
FIG. 17(a) is an explanatory view of an assembling method of the first and second caps of FIG. 12.
Figure 17B:
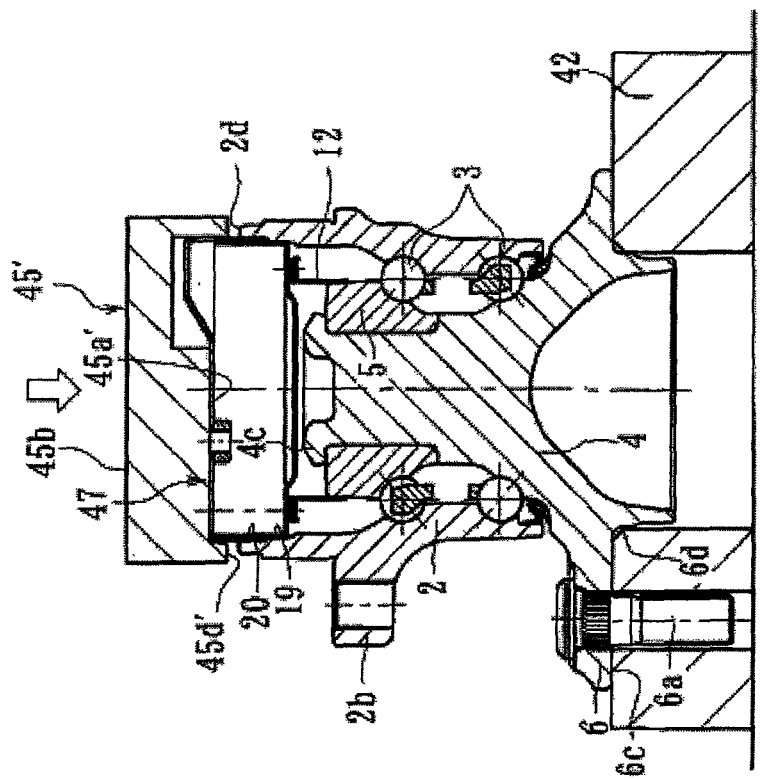
FIG. 17(b) is an explanatory view of a modification of FIG. 17(a).

FIG. 10 is a longitudinal-section view of a second embodiment of a wheel bearing apparatus. FIG. 11 is a partially enlarged view of a detecting portion of FIG. 10. FIG. 12 is a partially enlarged perspective view of a united condition of the first and second caps of FIG. 10. FIG. 13 is a partially enlarged view of a drain portion of FIG. 10. FIG. 14 is an explanatory view of an assembling method of the wheel bearing apparatus. FIG. 15(a) is an explanatory view of an assembling method of a pulser ring of FIG. 14. FIG. 15(b) is an explanatory view of a modification of FIG. 15(a). FIG. 16 is an explanatory view of an assembling method of the first and second caps of FIG. 14. FIG. 17(a) is an explanatory view of an assembling method of the first and second caps of FIG. 12. FIG. 17(b) is an explanatory view of a modification of FIG. 17(a). The second embodiment is the same as the first embodiment except that the first cap and the second cap are united. Accordingly, the same reference numerals are used in this embodiment to designate the same structural elements as those used in the previous embodiment.

The wheel bearing apparatus of FIG. 10 is a so-called "third generation" type for a driven wheel. It has an inner member 1, an outer member 2, and double row rolling elements 3, 3 contained between the inner and outer members 1 and 2. The inner member 1 includes the wheel hub 4 and an inner ring 5 press-fit onto the wheel hub 4.

A pulser ring 12 is press-fit onto the outer circumference of the inner ring 5. As shown in an enlarged view of FIG. 11, the pulser ring 12 includes an annular supporting member 13 and a magnetic encoder 14 integrally adhered to the inboard-side surface of the annular supporting member 13, via vulcanized adhesion.

The inboard-side opening of the outer member 2 is closed by a first cap 39 mounted on the outer member 2. The first cap 39 has anti-corrosion properties. The first cap 39 is formed from non-magnetic steel sheet such as austenitic stainless steel. The first cap 39 has a cup-shape in order to prevent adverse detecting performance of the rotational speed sensor 21. As shown in FIG. 11, the first cap 39 includes a cylindrical fitting portion 39a press-fit into the inner circumference of the inboard-side end of the outer member 2. A disk portion 39b extends radially inward from the fitting portion 39a. The disk portion 39b opposes the magnetic encoder 14, via a small axial gap. A bottom portion 39c extends from the disk portion 39b, via a bent portion 39c. The bottom portion 39c is bulged toward the outboard-side to enclose the inboard-side opening of the outer member 2.

A second cap 40 is mounted on an inboard-side from the first cap 39. More particularly, a second annular fitting surface 20 is formed inboard-side from the first fitting surface 19 of the outer member 2, via the stepped portion 19a. The second cap 40 is press-fit into the second fitting surface 20, via a predetermined interference. The first cap 39 is previously fit into the second cap 40 and united with it.

The second cap 40 is formed of cold-rolled steel sheet to have a cup-shape. The second cap 40 has a cylindrical fitting portion 40a inserted into the second fitting surface 20 of the outer member 2. A flange portion 40b, formed as a double bent portion, extends radially outward from the fitting portion 40a. The flange portion 40b is adapted to closely contact against the inboard-side end face 2d of the outer member 2. A bottom portion 40c extends radially inward from the flange portion 40b to enclose an inboard-side opening of the outer member 2.

A stepped portion 40aa is formed on an open end of the fitting portion 40a of the second cap 40. An open end 39aa of the fitting portion 39a of the first cap 39 is press-fit into the stepped portion 40aa of the second cap 40. In this case, the width dimensions of the stepped portion 40aa of the second cap 40 and the fitting portion 39a of the first cap 39 are determined. Thus, the air gap between the rotational speed sensor 21, mounted in the insert aperture 17 of the second cap 40, and the magnetic encoder 14 can be exactly set. This occurs by press-fitting the open end 39aa of the fitting portion 39a of the first cap 39 into the second cap 40 until the open end 39aa of the fitting portion 39a of the first cap 39 abuts against a wall of the stepped portion 40aa. This also prevents deformation of the first cap 39 even when the thickness t1 of the first cap 39 is set smaller than the thickness t2 of the second cap 40.

An elastic member 41 of synthetic rubber, such as NBR, is integrally adhered by vulcanized adhesion to the connected portion between the fitting portion 39a of the first cap 39 and the fitting portion 40a of the second cap 40. The elastic member 41 has an annular projection 41a. It projects radially outward from the fitting portion 40a of the second cap 40. The elastic member 41 is in close contact with the outer circumference of the fitting portion 39a of the first cap 39. The second fitting surface 20 of the outer member 2 is ground so that the surface roughness Ra is limited to 1 μm or less. The annular projection 41a is elastically deformed and tightly contacts the second fitting surface 20 of the outer member 2 when the second cap 40 is press-fit into the outer member 2. This forms the half metal structure to improve the sealability of the fitting portion 39a.

The insert aperture 17 is formed in the bottom portion 40c at a position corresponding to the magnetic encoder 14. The rotational speed sensor 21 is inserted and mounted in the aperture 17. The second cap 40 is formed with the flange portion 40b in close contact with the end face 2d of the outer member 2. Thus, it is possible to increase the rigidity of the second cap 40. This improves the positioning accuracy in the rotational speed sensor. In addition, the rotational speed sensor 21 is mounted in the horizontally positioned insert aperture 17. Thus, it is possible to suppress air gap variation between the rotational speed sensor 21 and the magnetic encoder 14. This provides stable detection accuracy even if the outer member 2 and the inner member 1 are relatively inclined by a lateral load applied to them from a wheel.

The rotational speed sensor 21 is inserted into the aperture 17 until it is abutted against or is nearly close to the disk portion 39b of the first cap 39. Accordingly, it is possible to obtain a desirable air gap and improve the assembling workability by eliminating a complicated air gap adjustment. In addition, the elastic member 41 is adhered to the connecting portion between the first and second caps 39, 40. Thus, it is possible to provide a wheel bearing apparatus that can surely seal the inside of the bearing apparatus.

If the first cap 39 and the second cap 40 are tried to be press-fit into a single simple cylindrical fitting surface, it is believed not only that the press-fitting stroke of the first cap 39 would be increased but that the assembling workability would be reduced. Also, it is believed that the thinner first cap 39 would be deformed during the press-fitting step. The second fitting surface 20 is formed in addition to the first fitting surface 19, via the stepped portion 19a. Thus, it is possible to improve the assembling workability and prevent deformation of the first cap 39 by suppressing the press-fitting stroke to a minimum.

The second cap 40 is formed of stainless-steel sheet or ferrous steel sheet. The entire surface of the ferrous steel sheet is then covered with a rust-preventing film by a cation electro-deposition coating. The rust-preventing film of cation electro-deposition coating is formed on the abutting portion between the second cap and the outer member 2. The phosphorus acid zinc process is carried out on the surface of the second cap 40 as a base process (preprocessing) of the cation electro-deposition. Thus, it is possible to prevent the generation of rust in the fitting portion 40a of the second cap 40 for a long term. Also, the rust-preventing film is prevented from being peeled off during press-fitting of the second cap 40. Thus, good sealability is obtained in the fitting portion 40a between the second cap 40 and the second fitting surface 20 and end face 2d of the outer member 2.

Vulcanized adhesive is applied prior to performing the cation electro-deposition coating on the second cap 40. In this case, it is possible to obtain a good sealability due to formation of a resin film. This occurs from solidified vulcanized adhesive by applying the vulcanized adhesive on the entire surface of the second cap, not only on the abutting portion of the end face 2d and the second fitting surface 20.

A drain 26 is radially outwardly formed in the bottom portion 40c of the second cap 40, as shown in FIG. 12. The drain 26 is formed in a bulged portion 27 formed on the bottom portion 40c of the second cap 40, at a region nearer to the ground. The bulged portion 27 is projected toward the inboard-side from the bottom portion 16c by a predetermined dimension L. As shown in a partially enlarged view of FIG. 13, the bulged portion 27 is effective when the knuckle 9 is not in a plane of the end face 2d of the outer member 2 and projects toward the inboard-side. Thus, the drain 26 is formed in the bulged portion 27 in a radially cut-through manner. The bulged portion 27 projects from the end face 2d of the outer member 2 toward the inboard-side. The bulged portion 27 discharges foreign matter entering into the second cap 40 through the drain 26 without being interrupted by the knuckle 9.

A method for assembling the wheel bearing apparatus will be described with reference to FIGS. 14~16. The wheel bearing apparatus is placed on a cradle (not shown) as shown in FIG. 14. The axis of the bearing apparatus and the wheel hub bottom are postioned vertical. The pulser ring 12 is press-fit onto the outer circumference of the inner ring 5 from the inboard-side opening of the outer member 2. The first cap 39 and the second cap 40 are press-fit into the first fitting surface 19 and the second fitting surface 20 of the outer member, respectively. In this case, the first cap 39 and the second cap 40 are previously united together. The open end 39aa of the fitting portion 39a of the first cap 39 is fit into the stepped portion 40aa of the fitting portion 40a of the second cap 40. The first cap 39 and the second cap 40 are press-fit into the first fitting surface 19 and the second fitting surface 20 of the outer member in this united state. A method for assembling of the pulser ring 12 and the united first and second caps 39, 40 will be described in detail.

As shown in FIG. 15(a), assembly of the pulser ring 12 to the wheel bearing apparatus is performed by positioning and securing a guiding jig 43 on the end of the inner ring 5 of the wheel bearing apparatus. The wheel bearing apparatus is vertically placed on the cradle 42. The guiding jig 43 has a substantially cylindrical body with a smooth outer circumference. One end of the guiding jig 43 has an annular groove 43a to accommodate the caulked portion 4c. The other end has a tapered outer circumference to center the pulser ring 12.

The guiding jig 43 has an axial reference surface that is the outboard-side surface 6c of the wheel mounting flange 6. A radial reference surface is a pilot portion 6d formed on the outboard-side end of the wheel hub 4.

The pulser ring 12 is placed on the tapered surface 43b of the guiding jig 43 and pressed down to a predetermined position by a pressing jig 44. The pressing jig 44 has a cup-shaped cross-section. The pressing jig bottom end has a projecting pressing portion 44a that presses down the pulser ring 12. The top end of the pressing jig has a flat pressing surface 44b. The middle portion of the pressing jig 44 has an abutting surface 44d to abut against the inboard-side end face 2d of the outer member 2. The pulser ring 12 is pressed down by a press machine laid on the pressing surface 44b until the abutting surface 44d abuts against the end face 2d of the outer member 2. In this case, the inner diameter of a recessed portion 44c of the pressing jig 44 is formed slightly larger than the outer diameter of the guiding jig 43. Thus, the pressing jig 44 can be fit onto the guiding jig 43, via a small guiding gap. In addition, the depth of the recessed portion 44c is set so that the top of the guiding jig 43 does not contact with the ceiling of the recessed portion 44c when the abutting surface 44d abuts against the end face 2d of the outer member 2. Thus, the axial position of the pulser ring 12 can be determined based on the position of the inboard-side end face 2d of the outer member 2.

As shown in FIG. 15(b), the axial position of the pulser ring 12 may be set by abutting the abutting surface 44d' of the pressing jig 44' against the inboard-side surface 2f of the outer member 2.

Assembly of the unit of the first cap and the second cap to the wheel bearing apparatus will be described with reference to FIG. 16. In the case of the second cap 40 (second embodiment according to the present disclosure), the first and second caps 39, 40, formed as a unit, are press-fit into the first and second fitting surfaces 19, 20, respectively. The positioning of both the first and second caps 39, 40 can be simultaneously completed by abutting an abutting surface 45d formed on the end of a recessed portion 45a against the flanged portion 40b of the second cap 40. The flanged portion 40b is pressed down until its side surface abuts against the inboard-side surface 2d of the outer member 2. In other flanged second cap (e.g. a second cap 52 formed with a flanged portion 40b according to a fifth embodiment), the assembling process can be similarly performed after having united the first and second caps 49, 52 together.

In the assembly of a flangeless second cap (e.g., a flangeless second cap 47 according to a third embodiment) to the wheel bearing apparatus, a pressing jig 45' with a cup-shaped configuration and a recessed portion 45a' to guide the outer circumference of the second cap 47, is pressed down on the second cap 47. The axial positioning of the second cap 47 can be completed by setting a depth of the recessed portion 45a'. Thus, an abutting surface 45d' abuts against the inboard-side end face 2d of the outer member 2 (FIG. 17(a)). Alternatively, an abutting surface 45d'' abuts against the inboard-side surface 2f of the body mounting flange 2b (FIG. 17(b)). According to this assembling method, the axial position of the pulser ring 12 and the axial position of the second cap are determined by the same pressing-down reference surface. Thus, it is possible to minimize variations of the distance, i.e., air gap between the magnetic encoder 14 and the bottom portion 40c of the second cap 47. A similar axial positioning can be performed as to a flangeless second cap (e.g., a flangeless second cap 49 according to a fourth embodiment).

In the press-fitting operations of the first cap 39, 46, 48 and the second cap 40, 47, 49, 52 of the second through fifth embodiments, the first and second caps are previously united together and press-fit into the outer member 2 in the united condition. Thus, it is possible to press-fit both the first and second caps by one press-fitting operation. This reduces the assembling steps to half and achieves a lower manufacturing cost of the wheel bearing apparatus. In addition, an exact positioning can be easily achieved only by abutting the flanged portion 40b of the second cap 40, 52 against the end face 2d of the outer member 2 or by abutting the pressing jig 45 against the end face 2d of the outer member 2 or against the inboard-side surface 2f of the body mounting flange 2b without any complicated positioning step.

Figure 18:
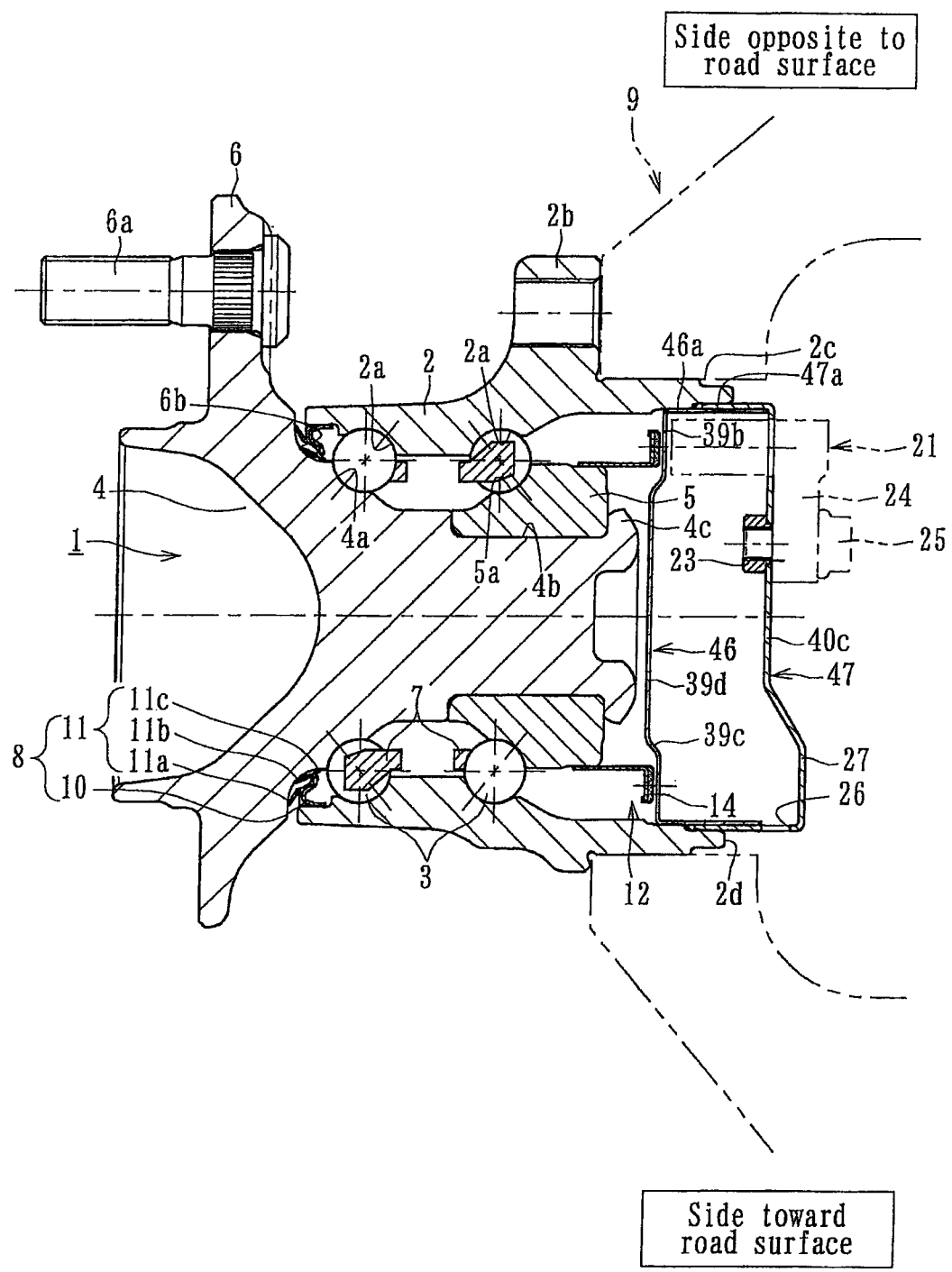
FIG. 18 is a longitudinal-section view of a third embodiment of a wheel bearing apparatus.
Figure 19:
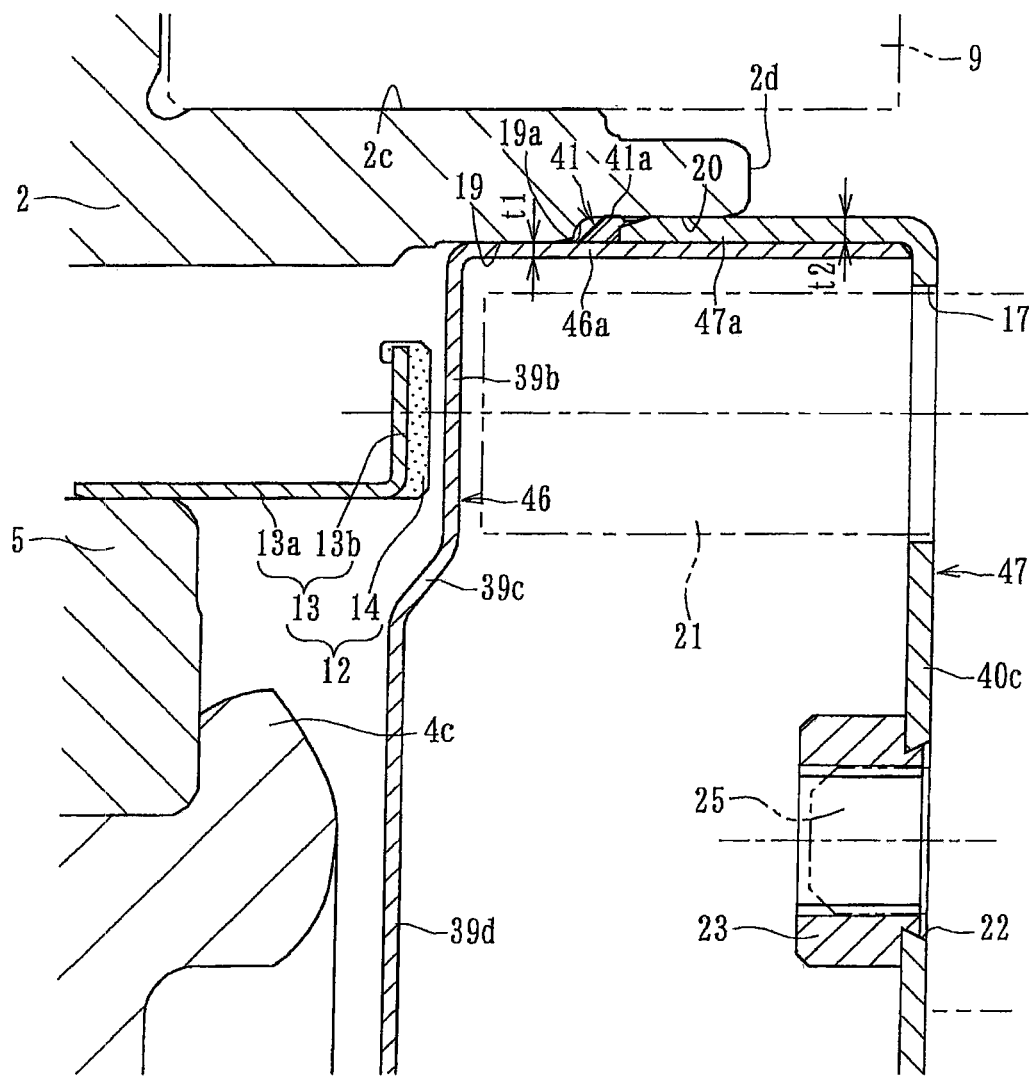
FIG. 19 is a partially enlarged view of a drain portion of FIG. 18.

FIG. 18 is a longitudinal-section view of a third embodiment of a wheel bearing apparatus. FIG. 19 is a partially enlarged view of a detecting portion of FIG. 18. The third embodiment is same as the second embodiment (FIG. 10) except for structures in the first cap and the second cap. Accordingly, the same reference numerals are used in this embodiment to designate the same structural elements as those used in the previous embodiments.

The wheel bearing apparatus of FIG. 18 is a so-called "third generation" type for a driven wheel. It includes an inner member 1, an outer member 2, and double row rolling elements 3, 3 contained between the inner and outer members 1 and 2. The pulser ring 12 is press-fit onto the outer circumference of the inner ring 5. The first cap 46 and the second cap 47 are press-fit into the inner circumference of the outer member 2 to enclose the inboard-side opening of the outer member 2.

The first cap 46 is press-formed of anti-corrosion and non-magnetic steel sheet such as austenitic stainless steel sheet. It has a cup-shape. As shown in FIG. 19, the first cap 46 includes a cylindrical fitting portion 46a press-fit into the inner circumference of the inboard-side end of the outer member 2. A disk portion 39b extends radially inward from the fitting portion 46a. The disk portion 39b opposes the magnetic encoder 14, via a small axial gap. A bottom portion 39d extends from the disk portion 39b, via a bent portion 39c bulged toward the outboard-side to enclose the inboard-side opening of the outer member 2.

The second cap 47 is press-formed of stainless-steel sheet or ferrous steel sheet into a cup-shaped configuration. A surface of the ferrous steel sheet is coated with a rust-preventing treatment. The second cap 47 includes a cylindrical fitting portion 47a press-fit into the second fitting surface 20 of the outer member 2. A bottom portion 40c extends radially inward from one end of the fitting portion 47a to enclose the inboard-side opening of the outer member 2. An elastic member 41 is adhered or vulcanizing adhered to the tip end of the fitting portion 47a. The elastic member 41 has an annular projection 41a projecting from the outer circumference of the second cap 47. The inner circumference of the elastic member 41 closely contacts with the outer circumference of the fitting portion 46a of the first cap 46.

The fitting portion 46a of the first cap 46 is previously fit into the fitting portion 47a of the second cap 47 to form a cap unit. In this case, the fitting portion 46a of the first cap 46 and the fitting portion 47a of the second cap 47 have predetermined width dimensions. The fitting portion 46a of the first cap 46 is press-fit into the fitting portion 47a of second cap 47 until the end face of the fitting portion 46a of the first cap 46 abuts against the bottom portion 40c of the second cap 47. This makes it possible to accurately set the air gap between the rotational speed sensor 21, mounted in the aperture 17 of the second cap 47, and the magnetic encoder 14.

According to this embodiment, the fitting portion 46a of the first cap 46 is press-fit into the fitting portion 47a of the second cap 47. They are previously united together. The fitting portion 47a of the second cap 47 is press-fit into the second fitting portion 20 of the outer member 2 in the united condition. Thus, it is possible to prevent deformation of the first cap 46 during its press-fitting operation if the thickness t1 of sheet forming the first cap 46 is set smaller than the thickness t2 of the second cap 47.

Figure 20:
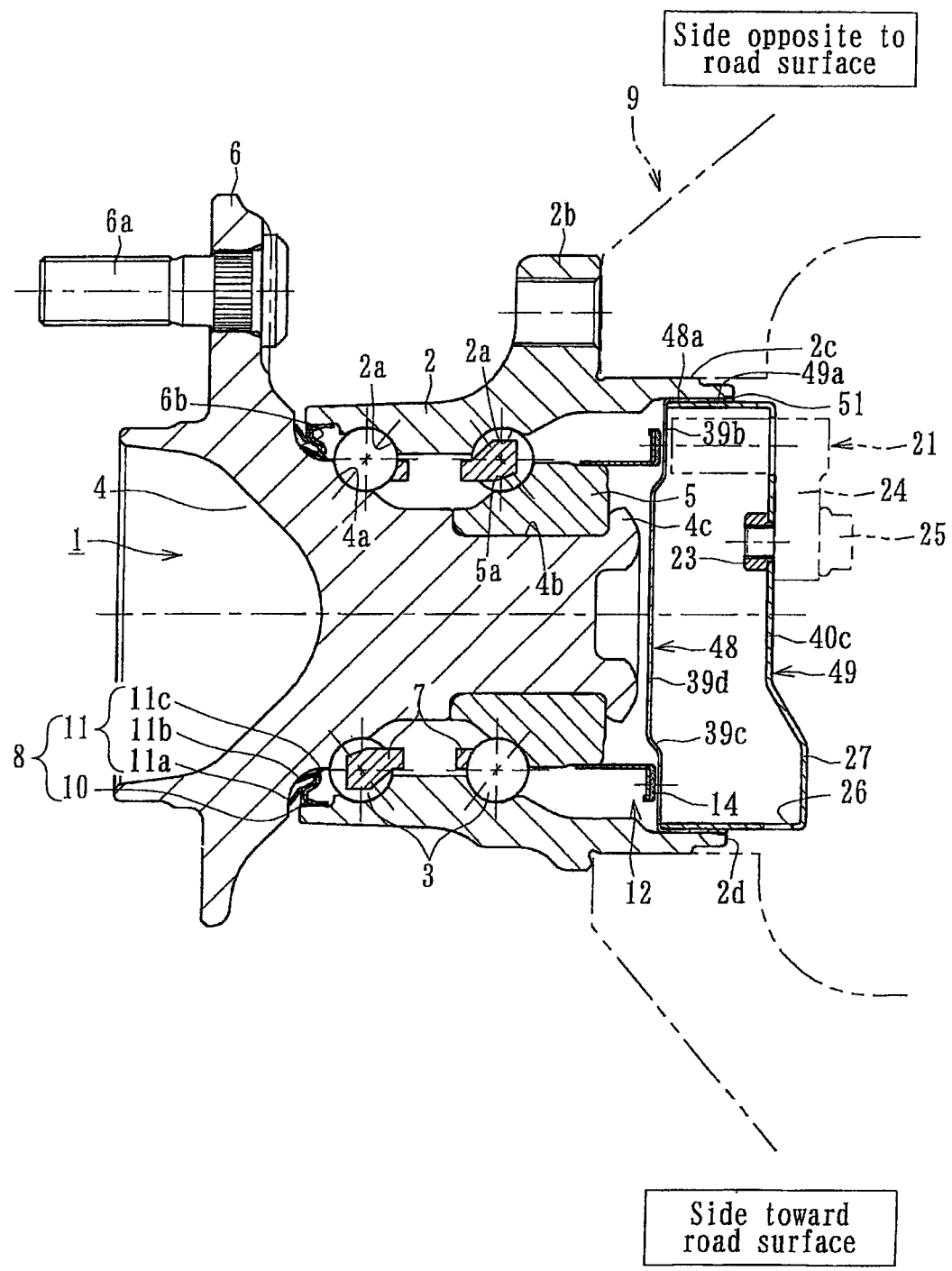
FIG. 20 is a longitudinal-section view of a fourth embodiment of a wheel bearing apparatus.
Figure 21:
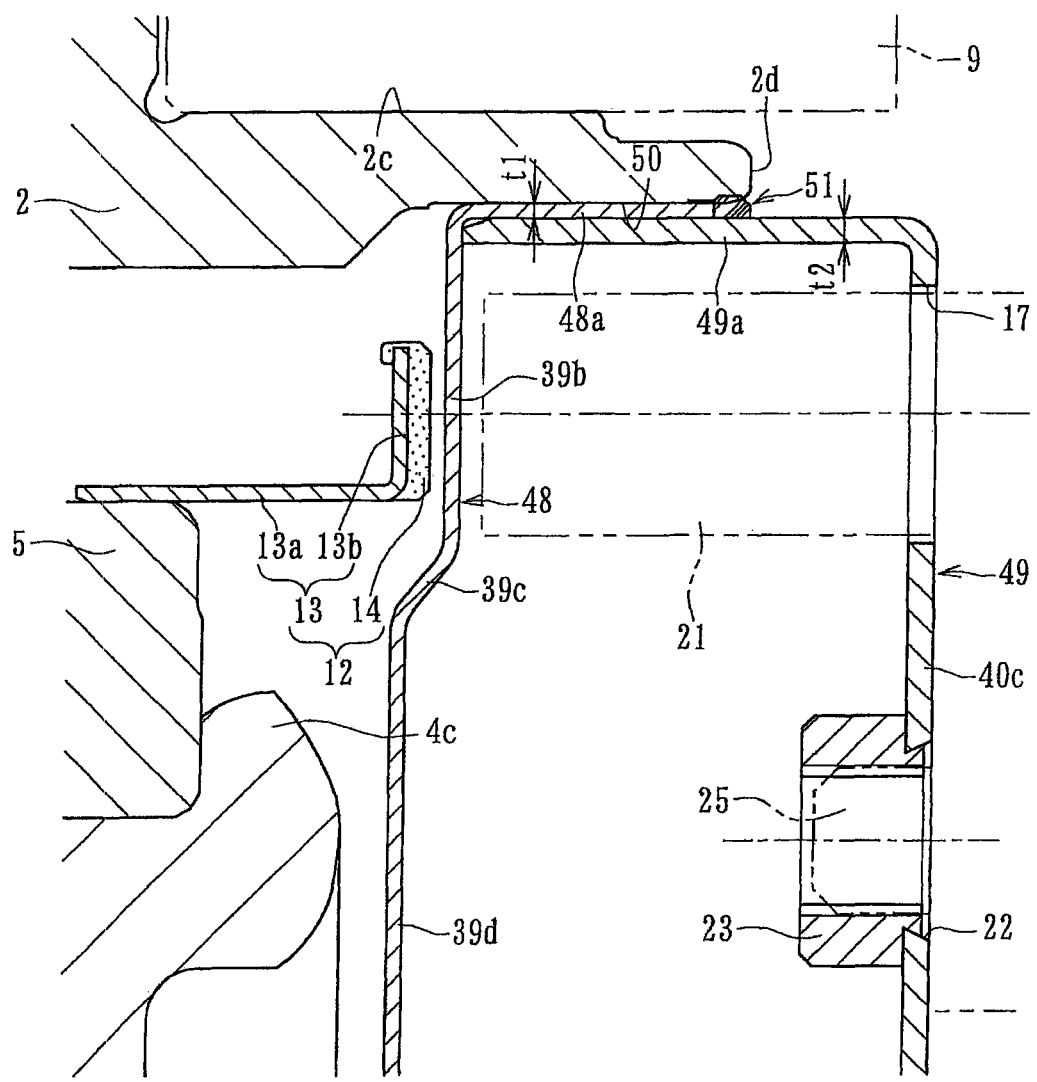
FIG. 21 is a partially enlarged view of a drain portion of FIG. 20.

FIG. 20 is a longitudinal-section view of a fourth embodiment of a wheel bearing apparatus. FIG. 21 is a partially enlarged view of a detecting portion of FIG. 20. The fourth embodiment is the same as the third embodiment (FIG. 18) except for structures in the first cap and the second cap. Accordingly, the same reference numerals are used in this embodiment to designate the same structural elements as those used in the previous embodiments.

The wheel bearing apparatus of FIG. 20 is a so-called "third generation" type for a driven wheel. It includes an inner member 1, an outer member 2, and double row rolling elements 3, 3 contained between the inner and outer members 1 and 2. The pulser ring 12 is press-fit onto the outer circumference of the inner ring 5. The first cap 48 and the second cap 49 are press-fit into the inner circumference of the outer member 2 to enclose the inboard-side opening of the outer member 2.

The first cap 48 is press-formed of anti-corrosion and non-magnetic steel sheet such as austenitic stainless steel sheet. It has a cup-shape. As shown in FIG. 21, the first cap 48 includes a cylindrical fitting portion 48a press-fit into the fitting surface 50 of the outer member 2. A disk portion 39b extends radially inward from the fitting portion 48a. The disk portion 39b opposes the magnetic encoder 14 via a small axial gap. A bottom portion 39d extends from the disk portion 39b, via a bent portion 39c, and is bulged toward the outboard-side to enclose the inboard-side opening of the outer member 2.

The second cap 49 is press-formed of stainless-steel sheet or ferrous steel sheet into a cup-shaped configuration. A surface of the ferrous steel sheet is coated with a rust-preventing treatment. The second cap 49 includes a cylindrical fitting portion 49a press-fit into the fitting portion 48a of the first cap 48. A bottom portion 40c extends radially inward from one end of the fitting portion 49a to enclose the inboard-side opening of the outer member 2.

The fitting portion 49a of the second cap 49 is previously fit into the fitting portion 48a of the first cap 48 to form a cap unit. The fitting portion 48a of the first cap 48 and the fitting portion 49a of the second cap 49 have predetermined width dimensions. The fitting portion 49a of the second cap 49 is press-fit into the fitting portion 48a of first cap 48 until the end face of the fitting portion 49a of the second cap 49 abuts against the disk portion 39b of the first cap 48. This makes it possible to accurately set the air gap between the rotational speed sensor 21, mounted in the aperture 17 of the second cap 47, and the magnetic encoder 14. Also, this prevents deformation of the first cap 48 during its press-fitting operation if the thickness t1 of sheet forming the first cap 48 is set smaller than the thickness t2 of the second cap 49.

An elastic member 51 of synthetic rubber, such as NBR, is integrally adhered to the connecting portion between the fitting portion 48a of the first cap 48 and the fitting portion 49a of the second cap 49. The elastic member 51 projects radially outwardly from the outer circumference of the fitting portion 48a of the first cap. It is elastically deformed and tightly contacts the end inner circumference of the outer member 2 when the first cap 48 is press-fit into the outer member 2. This forms the half metal structure in order to improve the sealability of the fitting portion 48a of the first cap 48.

The fitting portion 49a of the second cap 49 is previously fit into the fitting portion 48a of the first cap 48 to form a cap unit. The fitting portion 48a of the first cap 48 is securely press-fit into the fitting surface 50 of the outer member 2. Thus, it is possible to make the fitting width of the first and second caps 48, 49 large. This prevents deformation of the first cap 48 during its press-fitting operation if the thickness t1 of sheet forming the first cap 48 is set smaller than the thickness t2 of the second cap 49.

Figure 22:
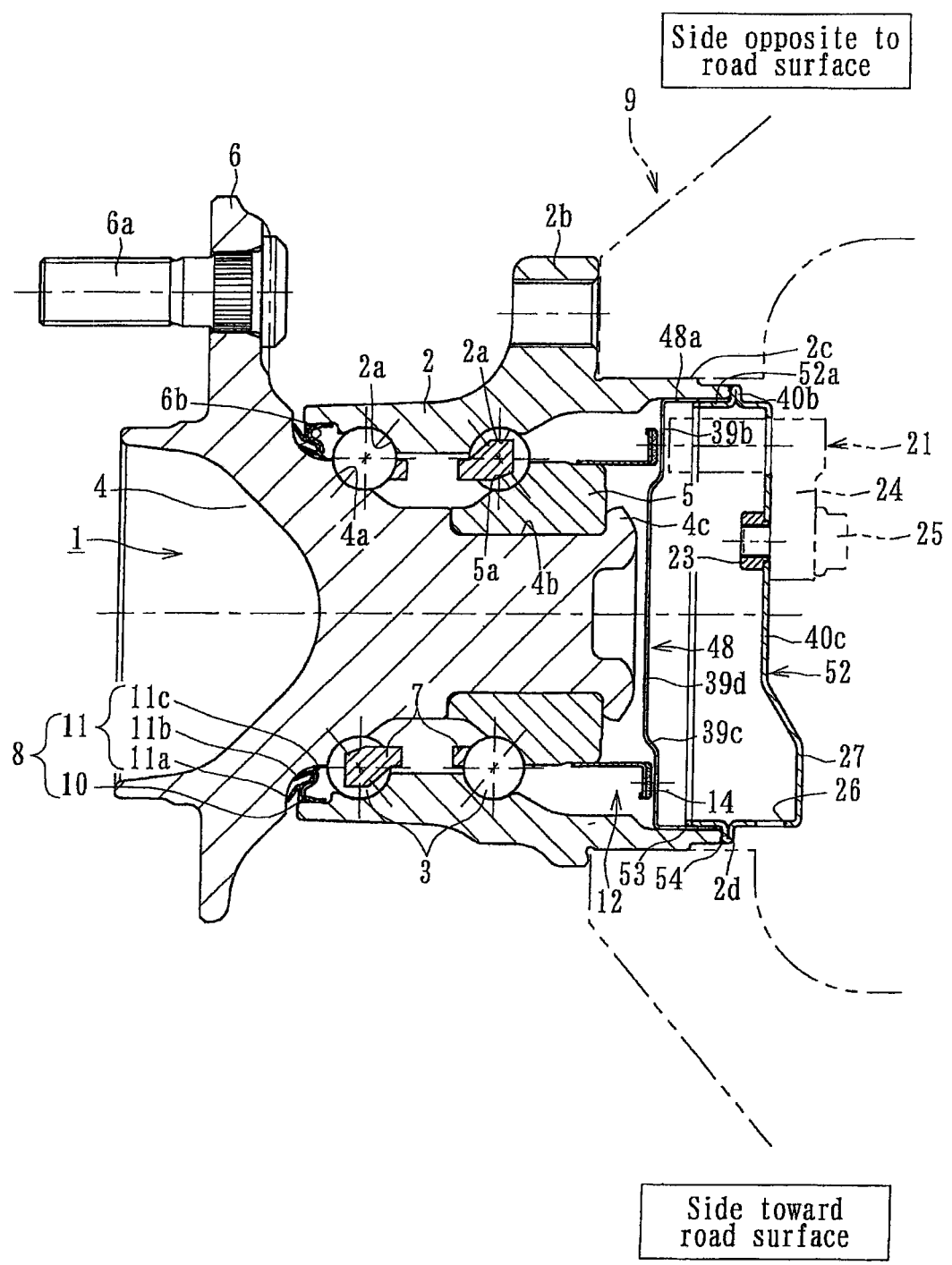
FIG. 22 is a longitudinal-section view of a fifth embodiment of a wheel bearing apparatus.
Figure 23:
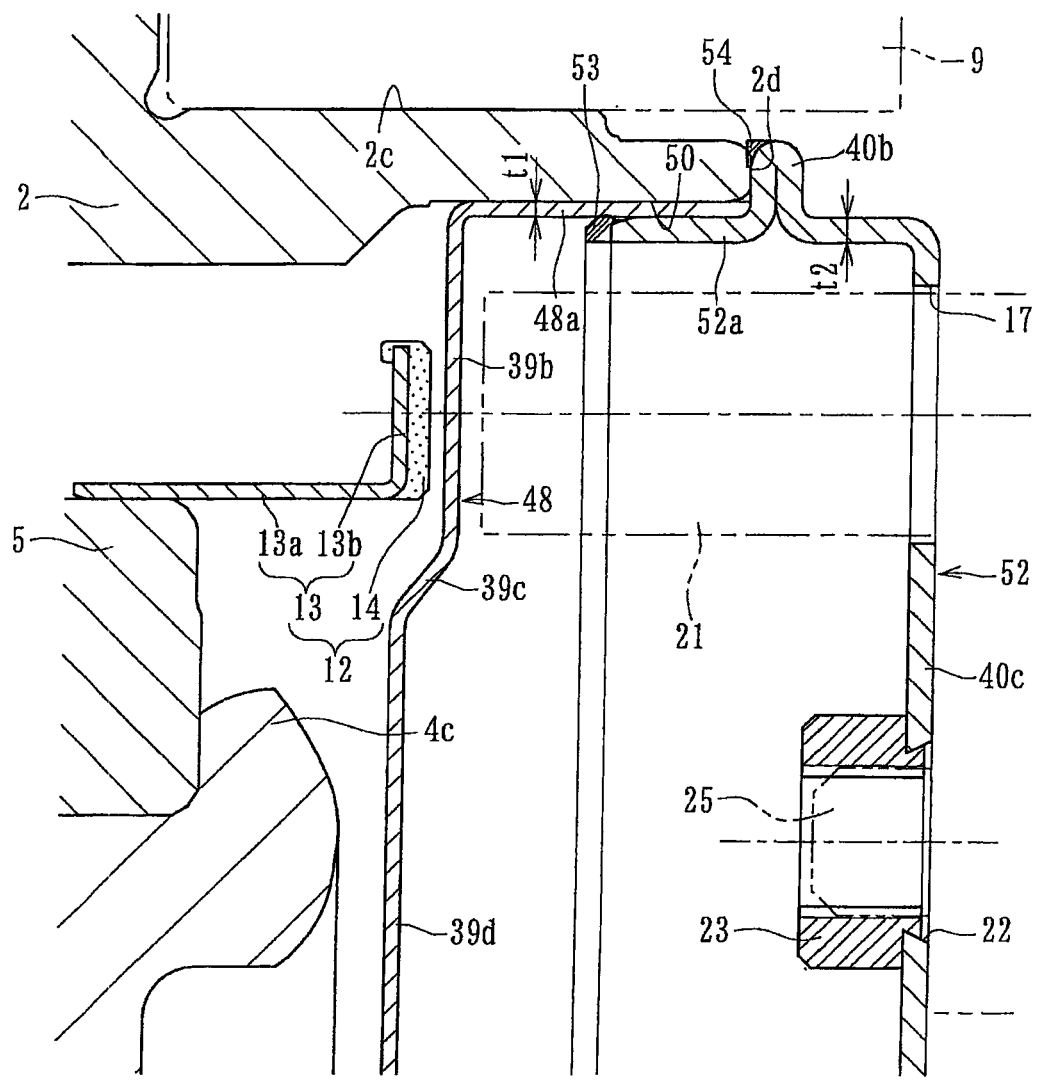
FIG. 23 is a partially enlarged view of a drain portion of FIG. 22.
Figure 24:
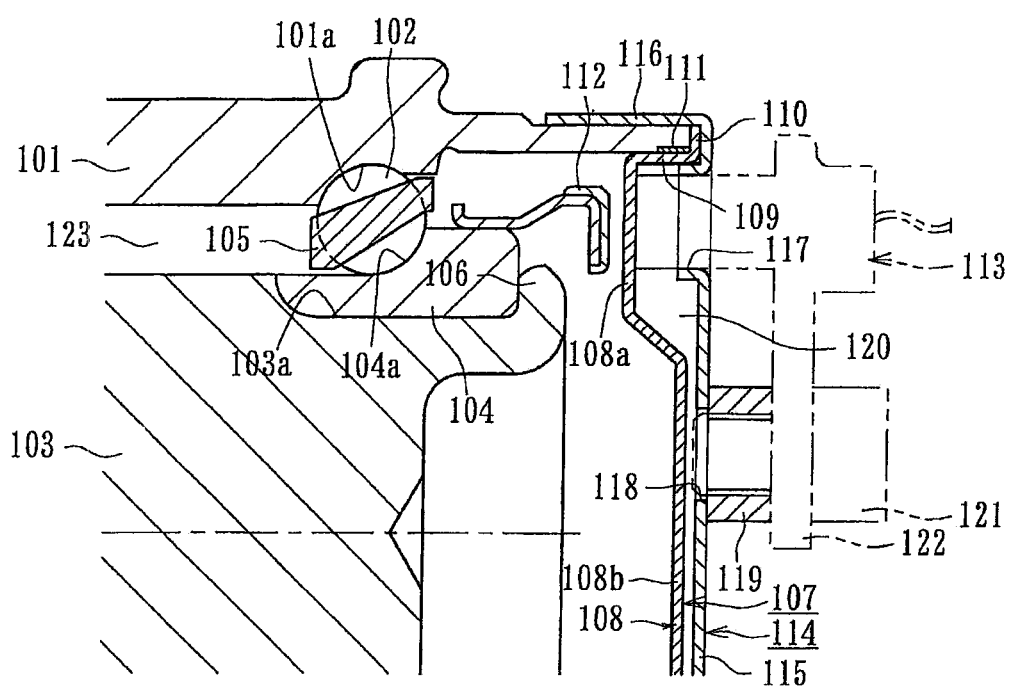
FIG. 24 is a partially enlarged view of a prior art wheel bearing apparatus.

FIG. 22 is a longitudinal-section view of a fifth embodiment of a wheel bearing apparatus. FIG. 23 is a partially enlarged view of a detecting portion of FIG. 22. This fifth embodiment is same as the fourth embodiment (FIG. 20) except for structures in the second cap. Accordingly, the same reference numerals are used in this embodiment to designate the same structural elements as those used in the previous embodiments.

This wheel bearing apparatus is also a so-called "third generation" type for a driven wheel. It includes an inner member 1, an outer member 2, and double row rolling elements 3, 3 contained between the inner and outer members 1 and 2. The pulser ring 12 is press-fit onto the outer circumference of the inner ring 5. The first cap 48 and the second cap 52 are press-fit into the inner circumference of the outer member 2 to enclose the inboard-side opening of the outer member 2.

As shown in the enlarged view of FIG. 21, the first cap 48 includes a cylindrical fitting portion 48a press-fit into the fitting surface 50 of the outer member 2. A fitting portion 52a of the second cap 52 is fit into the fitting portion 48a of the first cap 48.

The second cap 52 is press-formed of stainless-steel sheet or ferrous steel sheet into a cup-shaped configuration. A surface of the ferrous steel sheet is coated with a rust-preventing treatment. The second cap 52 includes a cylindrical fitting portion 52a. A flange portion 40b, formed as a double bent portion, extends radially outward from the fitting portion 52a. It is adapted to closely contact against the inboard-side end face 2d of the outer member 2. A bottom portion 40c extends radially inward from the flange portion 40b to enclose an inboard-side opening of the outer member 2.

The fitting portion 52a of the second cap 52 is previously fit into the fitting portion 48a of the first cap 48 to form a cap unit. The fitting portion 48a of the first cap 48 and the fitting portion 52a of the second cap 52 have predetermined width dimensions. The fitting portion 48a of the first cap 48 is press-fit onto the fitting portion 52a of second cap 52 until the end face of the fitting portion 48a of the first cap 48 abuts against the side surface of the flanged portion 40b of the second cap 52. The air gap between the rotational speed sensor 21, mounted in the insert aperture 17 of the second cap 52, and the magnetic encoder 14 can be exactly set by press-fitting the first and second caps 48, 52 into the fitting surface 50 of the outer member 2 until the side surface of the flanged portion 40b abuts against the end face 2d of the outer member 2.

An elastic member 53, of synthetic rubber such as NBR, is integrally adhered to the connecting portion between the fitting portion 48a of the first cap 48 and the fitting portion 52a of the second cap 52. The elastic member 53 projects radially outwardly from the outer circumference of the fitting portion 52a of the second cap 52. It is elastically deformed and tightly contacts the fitting portion 48a of the first cap 48 when the second cap 52 is press-fit into the first cap 48. This improves the sealability of the fitting portion 48a of the first cap 48 and the fitting portion 52a of the second cap 52. In addition, another elastic member 54, of synthetic rubber such as NBR, is integrally adhered to the connecting portion between the flanged portion 40b of the second cap 52 and the outer member 2. This improves the sealability of the first cap 48. Thus, it protects the inside of the wheel bearing apparatus.

The fitting portion 52a of the second cap 52 is previously fit into the fitting portion 48a of the first cap 48 to form a cap unit. The fitting portion 48a of the first cap 48 is securely press-fit into the fitting surface 50 of the outer member 2. Thus, it is possible to increase the rigidity of the cap unit. This prevents deformation of the first cap 48 during its press-fitting operation if the thickness t1 of sheet forming the first cap 48 is set smaller than the thickness t2 of the second cap 52.

The present disclosure can be applied to any wheel bearing apparatus of the inner ring rotational type for a driven wheel type using balls or tapered rollers as rolling elements.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
an outer member integrally formed with double row outer raceway surfaces on its inner circumference;
an inner member including a wheel hub and at least one inner ring, the wheel hub integrally formed, on one end, with a wheel mounting flange, a cylindrical portion axially extending from the wheel mounting flange, the inner ring being press-fit onto the cylindrical portion of the wheel hub, the inner member including double row inner raceway surfaces on its outer circumference, the double row inner raceway surfaces oppose the double row outer raceway surfaces;
double row rolling elements are contained between the inner raceway surfaces and outer raceway surfaces of the inner member and outer member;
a pulser ring fit onto the outer circumference of the inner ring, the pulser ring has magnetic characteristics alternately and equidistantly varying in a circumferential direction;
a cup-shaped second cap press-formed of steel sheet, the second cap including cylindrical fitting portion and a bottom portion and the cylindrical fitting portion is fit on an inboard-side end of the outer member a bulged portion is formed on the bottom portion of the second cap below an axis of the second cap toward the ground, and a drain is radially cut-through the bulged portion in a bottom wall of the bulged portion;
a rotational speed sensor mounted at a radially outer position on the second cap, the rotational speed sensor is arranged opposite to the pulser ring with a predetermined axial air gap between the rotational speed sensor and pulser ring;
a cup-shaped first cap is press-fit into the inner circumference of an inboard-side end of the outer member, with a predetermined interference, the first cap press-formed from non-magnetic austenitic stainless steel sheet, the first cap has a cylindrical fitting portion and a disk portion, the fitting portion press-fit into the inner circumference of the inboard-side end of the outer member, the disk portion extends radially inward from the fitting portion and opposes the pulser ring with a small axial gap;
the rotational speed sensor is arranged opposite to the pulser ring, with the first cap, the speed sensor abuts against or is close to the disk portion of the first cap; and
the second cap is press-fit into the inner circumference of an inboard-side end of the outer member with a predetermined interference.

2. The wheel bearing apparatus of claim 1, wherein a first fitting surface is formed on the inner circumference of the inboard-side end of the outer member, a second fitting surface is formed with a stepped portion on the inner circumference of the outer member at a further inboard-side from the first fitting surface and the first cap is press-fit onto the first fitting surface and the second cap is press-fit onto the second fitting surface.

3. The wheel bearing apparatus of claim 2, wherein the first fitting surface and the second fitting surface are simultaneously ground by a formed grinding wheel with the double row outer raceway surfaces.

4. The wheel bearing apparatus of claim 2, wherein a depth of the second fitting surface is larger than the thickness (t2) of the second cap.

5. The wheel bearing apparatus of claim 1, wherein the second cap includes a cylindrical fitting portion fit on the inner circumference of the inboard-side end of the outer member, a flange portion, formed as a double bent portion, extends radially outward from the fitting portion, the flange portion closely contacts against the inboard-side end face of the outer member, and a bottom portion extends radially inward from the flange portion to enclose an inboard-side opening of the outer member, and an insert aperture is formed in the bottom portion, the insert aperture is positioned corresponding to the pulser ring where the rotational speed sensor is inserted and mounted in the aperture.

6. The wheel bearing apparatus of claim 1, wherein the inner circumference between the first fitting surface and the second fitting surface of the outer member is formed as a tapered surface with its radius gradually increasing at an angle ($\alpha$) toward the opening of the outer member.

7. The wheel bearing apparatus of claim 1, wherein the second cap is coated with a rust-preventing coating film by cation electro-deposition.

8. The wheel bearing apparatus of claim 1, wherein the second cap is formed from rust-prevented steel sheet and an elastic member is integrally adhered on the second cap at a portion contacted by the outer member.

9. The wheel bearing apparatus of claim 8, wherein the elastic member of the second cap is formed from a rust-preventing coating film by cation electro-deposition.

10. The wheel bearing apparatus of claim 8, wherein the elastic member of the second cap is a packing member, formed from synthetic rubber, integrally adhered to the second cap by vulcanized adhesion.

11. The wheel bearing apparatus of claim 1, wherein the drain is formed as a tongue by punching and bending the bottom wall of the bulged portion.

12. The wheel bearing apparatus of claim 1, wherein a radially reduced portion is formed between the fitting portion and the disk portion of the first cap and an elastic member, of synthetic rubber, is integrally adhered to the radially reduced portion by vulcanized adhesion, and the elastic member is arranged so that it does not project from the side surface of the disk portion toward the inboard-side to prevent the elastic member from interfering with the rotational speed sensor and the elastic member is formed with an annular projection projecting radially outward from the fitting portion.

13. The wheel bearing apparatus of claim 1, wherein the second cap is press-fit with a predetermined interference into the inner circumference of the inboard-side end of the outer member in an overlapped state with the first cap.

14. The wheel bearing apparatus of claim 13, wherein a stepped portion is formed on an opening end of the fitting portion of the second cap, the stepped portion and the fitting portion of the first cap have predetermined width dimensions, and an opening end of the fitting portion of the first cap is press-fit into the second cap until the opening end of the fitting portion of the first cap is abuts against a wall of the stepped portion.

15. The wheel bearing apparatus of claim 13, wherein the fitting portion of the first cap and the fitting portion of the second cap have predetermined width dimensions, the fitting portion of the first cap is press-fit into the fitting portion of second cap until the end face of the fitting portion of the first cap is abuts against the bottom portion of the second cap.

16. The wheel bearing apparatus of claim 13, wherein the fitting portion of the first cap and the fitting portion of the second cap have predetermined width dimensions, and the fitting portion of the second cap is press-fit into the fitting portion of first cap until the end face of the fitting portion of the second cap is abuts against the disk portion of the first cap.

17. The wheel bearing apparatus of claim 13, wherein the second cap has a flange portion, formed as a double bent portion, extending radially outward from the fitting portion to closely contact against the inboard-side end face of the outer member, the fitting portion of the first cap and the fitting portion of the second cap have predetermined width dimensions, the fitting portion of the first cap is press-fit onto the fitting portion of second cap until the opening end of the fitting portion of the first cap abuts against the side surface of the flange portion, and the second cap is press-fit into the outer member until the side surface of the flange portion is abuts against the end face of the outer member.

18. The wheel bearing apparatus of claim 13, wherein the elastic member, of synthetic rubber, is integrally adhered by vulcanized adhesion to the connected portion between the fitting portion of the first cap and the fitting portion of the second cap, and the elastic member is elastically deformed and press-contacts the fitting surface of the outer member and the elastic member closely contacts the fitting portion of the first cap.

19. A wheel bearing apparatus comprising:
   an outer member integrally formed with double row outer raceway surfaces on its inner circumference;
   an inner member including a wheel hub and at least one inner ring, the wheel hub integrally formed, on one end, with a wheel mounting flange, a cylindrical portion axially extending from the wheel mounting flange, the inner ring being press-fit onto the cylindrical portion of the wheel hub, the inner member including double row inner raceway surfaces on its outer circumference, the double row inner raceway surfaces oppose the double row outer raceway surfaces;
   double row rolling elements are contained between the inner raceway surfaces and outer raceway surfaces of the inner member and outer member;
   a pulser ring fit onto the outer circumference of the inner ring, the pulser ring has magnetic characteristics alternately and equidistantly varying in a circumferential direction;
   a cup-shaped second cap is press-formed of steel sheet, the second cap including cylindrical fitting portion and a bottom portion and the cylindrical fitting portion is fit on an inboard-side end of the outer member;
   a rotational speed sensor mounted at a radially outer position on the second cap, the rotational speed sensor arranged opposite to the pulser ring with a predetermined axial air gap;
   a cup-shaped first cap is press-fit into the inner circumference of an inboard-side end of the outer member with a predetermined interference, the first cap press-formed from non-magnetic austenitic stainless steel sheet, the first cap has a cylindrical fitting portion and a disk portion, the fitting portion press-fit into the inner circumference of the inboard-side end of the outer member, the disk portion extends radially inward from the fitting portion and opposes the pulser ring with a small axial gap;
   the rotational speed sensor is arranged opposite to the pulser ring in the first cap, the speed sensor abuts against or is close to the disk portion of the first cap; and
   the second cap is press-fit into the inner circumference of an inboard-side end of the outer member via a predetermined interference; and
   the second cap is press-fit, with a predetermined interference, into the inner circumference of the inboard-side end of the outer member in an overlapped state with the first cap.

* * * * *

UNITED STATES PATENT AND TRADEMARK OFFICE
CERTIFICATE OF CORRECTION

PATENT NO. : 9,527,345 B2
APPLICATION NO. : 14/491991
DATED : December 27, 2016
INVENTOR(S) : Syougo Suzuki et al.

It is certified that error appears in the above-identified patent and that said Letters Patent is hereby corrected as shown below:

In the Specification

Column 21
Line 48     "t2of" should be --t2 of--.

Column 22
Line 53     "t2of" should be --t2 of--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*